(12) United States Patent
Droms et al.

(10) Patent No.: US 7,789,308 B2
(45) Date of Patent: Sep. 7, 2010

(54) LOCATING AND PROVISIONING DEVICES IN A NETWORK

(75) Inventors: Ralph Droms, Boxborough, MA (US); Roland Saville, Oakland Park, FL (US); Gary Dennis Vogel, Jr., Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1018 days.

(21) Appl. No.: 11/119,169

(22) Filed: Apr. 29, 2005

(65) Prior Publication Data

US 2005/0253718 A1    Nov. 17, 2005

Related U.S. Application Data

(60) Provisional application No. 60/570,999, filed on May 13, 2004.

(51) Int. Cl.
G06K 7/08    (2006.01)
(52) U.S. Cl. .................. 235/451; 235/385; 235/435; 235/439; 340/572.1; 340/825.49; 340/10.41
(58) Field of Classification Search .................. 235/385, 235/451, 435, 439; 340/572.1, 825.49, 10.41
See application file for complete search history.

(56) References Cited

U.S. PATENT DOCUMENTS

| | | | |
|---|---|---|---|
| 4,625,081 | A | 11/1986 | Lotito et al. |
| 4,688,026 | A | 8/1987 | Scribner et al. |
| 5,339,073 | A | 8/1994 | Dodd et al. |
| 5,574,722 | A | 11/1996 | Slykhouse et al. |
| 5,588,009 | A | 12/1996 | Will |
| 5,646,616 | A | 7/1997 | Komatsu |
| 5,790,542 | A | 8/1998 | Kim et al. |
| 5,819,042 | A | 10/1998 | Hansen |
| 5,832,503 | A | 11/1998 | Malik et al. |
| 5,850,187 | A | 12/1998 | Carrender et al. |
| 5,887,176 | A | 3/1999 | Griffith et al. |

(Continued)

FOREIGN PATENT DOCUMENTS

WO    WO2005-060208    6/2005

(Continued)

OTHER PUBLICATIONS

EPC™ Tag Data Standards Version 1.1 Rev.1.24, EPCglobal, Standard Specification, Apr. 1, 2004, 78 pages.

(Continued)

*Primary Examiner*—Michael G Lee
*Assistant Examiner*—Kristy A Haupt
(74) *Attorney, Agent, or Firm*—Weaver Austin Villeneuve & Sampson LLP

(57)    ABSTRACT

Methods and devices are provided for locating, identifying and provisioning devices in a network. According to some implementations of the invention, a combination of EPC code information and existing networking standards form the basis of identifying and provisioning methods. For example, location information included in a DHCPDISCOVER request can be used to determine appropriate configurations for networked devices. In some such implementations, the location information is read from an RFID tag near the networked device and is inserted in the DHCPDISCOVER request. The location information may include any type of absolute or relative coordinate, positioning, cartographic or similar information and/or information from which such information may be derived.

37 Claims, 14 Drawing Sheets

U.S. PATENT DOCUMENTS

| | | |
|---|---|---|
| 6,111,517 A | 8/2000 | Atick et al. |
| 6,115,079 A | 9/2000 | McRae |
| 6,125,391 A | 9/2000 | Meltzer et al. |
| 6,226,675 B1 | 5/2001 | Meltzer et al. |
| 6,300,903 B1 | 10/2001 | Richards et al. |
| 6,337,856 B1 | 1/2002 | Schanhals et al. |
| 6,356,951 B1 | 3/2002 | Gentry |
| 6,473,858 B1 | 10/2002 | Shimomura et al. |
| 6,539,281 B2 | 3/2003 | Wan et al. |
| 6,553,489 B1 | 4/2003 | Osler et al. |
| 6,587,874 B1 | 7/2003 | Golla et al. |
| 6,665,713 B1 | 12/2003 | Hada et al. |
| 6,772,204 B1 | 8/2004 | Hansen et al. |
| 6,810,040 B1 | 10/2004 | Lee et al. |
| 6,843,121 B1 | 1/2005 | DeBar et al. |
| 6,862,270 B1 | 3/2005 | Ho |
| 6,868,426 B1 | 3/2005 | Mankoff |
| 6,912,213 B2 | 6/2005 | Kim |
| 6,944,678 B2 | 9/2005 | Lu et al. |
| 6,950,822 B1 | 9/2005 | Idicula et al. |
| 6,963,282 B1 | 11/2005 | Yeates et al. |
| 6,996,842 B2 | 2/2006 | Strahm et al. |
| 7,002,907 B1 | 2/2006 | Chen et al. |
| 7,054,924 B1 | 5/2006 | Harvey et al. |
| 7,057,511 B2 | 6/2006 | Shanks et al. |
| 7,064,660 B2 | 6/2006 | Perkins et al. |
| 7,075,412 B1 | 7/2006 | Reynolds et al. |
| 7,081,819 B2 | 7/2006 | Martinez de Velasco Cortina et al. |
| 7,103,040 B2 * | 9/2006 | Aalbers et al. ............... 370/388 |
| 7,103,886 B2 | 9/2006 | Haller et al. |
| 7,111,163 B1 | 9/2006 | Haney |
| 7,120,139 B1 | 10/2006 | Kung et al. |
| 7,129,837 B2 | 10/2006 | Shannon et al. |
| 7,134,075 B2 | 11/2006 | Hind et al. |
| 7,165,722 B2 | 1/2007 | Shafer et al. |
| 7,177,915 B2 | 2/2007 | Kopchik et al. |
| 7,205,897 B2 | 4/2007 | Lin |
| 7,213,768 B2 | 5/2007 | Patel et al. |
| 7,215,637 B1 | 5/2007 | Ferguson et al. |
| 7,221,660 B1 | 5/2007 | Simonson et al. |
| 7,239,634 B1 | 7/2007 | Chakravorty |
| 7,249,170 B2 | 7/2007 | Tindal et al. |
| 7,260,115 B1 | 8/2007 | DeFord |
| 7,322,523 B2 | 1/2008 | Howarth et al. |
| 7,325,734 B2 * | 2/2008 | Howarth et al. ............. 235/451 |
| 7,333,001 B2 | 2/2008 | Lane et al. |
| 7,333,479 B2 | 2/2008 | Jalkanen et al. |
| 7,336,175 B2 | 2/2008 | Howarth et al. |
| 7,345,585 B2 | 3/2008 | Singhal et al. |
| 7,363,353 B2 | 4/2008 | Ganesan et al. |
| 7,376,755 B2 | 5/2008 | Pandya |
| 7,394,381 B2 | 7/2008 | Hanson et al. |
| 7,422,152 B2 | 9/2008 | Howarth et al. |
| 2001/0012292 A1 | 8/2001 | Merrill et al. |
| 2001/0028308 A1 | 10/2001 | De La Huerga |
| 2002/0016739 A1 | 2/2002 | Ogasawara |
| 2002/0075805 A1 | 6/2002 | Gupta et al. |
| 2002/0114274 A1 | 8/2002 | Sturges et al. |
| 2002/0143981 A1 | 10/2002 | DeLima et al. |
| 2002/0161907 A1 | 10/2002 | Moon |
| 2002/0163933 A1 | 11/2002 | Benveniste |
| 2002/0191622 A1 | 12/2002 | Zdan |
| 2003/0028616 A1 | 2/2003 | Aoki et al. |
| 2003/0046339 A1 | 3/2003 | Ip |
| 2003/0055818 A1 | 3/2003 | Faybishenko et al. |
| 2003/0065784 A1 | 4/2003 | Herrod |
| 2003/0093530 A1 | 5/2003 | Syed |
| 2003/0095032 A1 | 5/2003 | Hoshino et al. |
| 2003/0163603 A1 | 8/2003 | Fry et al. |
| 2003/0174714 A1 | 9/2003 | Manik et al. |
| 2003/0177374 A1 | 9/2003 | Yung et al. |
| 2003/0189935 A1 | 10/2003 | Warden et al. |
| 2003/0226887 A1 | 12/2003 | Hoshino et al. |
| 2004/0006613 A1 | 1/2004 | Lemieus et al. |
| 2004/0021569 A1 | 2/2004 | Lepkofker et al. |
| 2004/0022250 A1 | 2/2004 | Chen et al. |
| 2004/0022255 A1 | 2/2004 | Chen et al. |
| 2004/0061646 A1 | 4/2004 | Andrews et al. |
| 2004/0069852 A1 | 4/2004 | Seppinen et al. |
| 2004/0100383 A1 | 5/2004 | Chen et al. |
| 2004/0108795 A1 | 6/2004 | Meek et al. |
| 2004/0128389 A1 | 7/2004 | Kopchik |
| 2004/0257202 A1 | 12/2004 | Coughlin et al. |
| 2004/0268357 A1 | 12/2004 | Joy et al. |
| 2005/0021626 A1 | 1/2005 | Prajapat et al. |
| 2005/0027778 A1 | 2/2005 | Dimitrelis et al. |
| 2005/0041670 A1 | 2/2005 | Lin et al. |
| 2005/0054346 A1 | 3/2005 | Windham et al. |
| 2005/0080914 A1 | 4/2005 | Lerner et al. |
| 2005/0093679 A1 | 5/2005 | Zai et al. |
| 2005/0094611 A1 | 5/2005 | Cheong et al. |
| 2005/0099270 A1 | 5/2005 | Diorio et al. |
| 2005/0114394 A1 | 5/2005 | Kaipa et al. |
| 2005/0060208 A1 | 6/2005 | Melsen |
| 2005/0169171 A1 | 8/2005 | Cheng et al. |
| 2005/0199716 A1 | 9/2005 | Shafer et al. |
| 2005/0209947 A1 | 9/2005 | Shafer |
| 2005/0213591 A1 | 9/2005 | Nakazawa et al. |
| 2005/0228887 A1 | 10/2005 | Wang et al. |
| 2005/0252957 A1 | 11/2005 | Howarth et al. |
| 2005/0252970 A1 | 11/2005 | Howarth et al. |
| 2005/0252971 A1 | 11/2005 | Howarth et al. |
| 2005/0253717 A1 | 11/2005 | Howarth et al. |
| 2005/0253722 A1 * | 11/2005 | Droms et al. ............ 340/572.1 |
| 2005/0264420 A1 | 12/2005 | Vogel et al. |
| 2006/0005035 A1 | 1/2006 | Coughlin |
| 2006/0010086 A1 | 1/2006 | Klein |
| 2006/0021010 A1 | 1/2006 | Atkins et al. |
| 2006/0022801 A1 | 2/2006 | Husak et al. |
| 2006/0033606 A1 | 2/2006 | Howarth et al. |
| 2006/0044111 A1 | 3/2006 | Kollar et al. |
| 2006/0047464 A1 | 3/2006 | Kumar et al. |
| 2006/0053234 A1 | 3/2006 | Kumar et al. |
| 2006/0091999 A1 | 5/2006 | Howarth |
| 2006/0143318 A1 | 6/2006 | Prajapat et al. |
| 2006/0208885 A1 | 9/2006 | Lin |
| 2006/0253590 A1 | 11/2006 | Nagy et al. |
| 2006/0266832 A1 | 11/2006 | Howarth et al. |
| 2006/0280181 A1 | 12/2006 | Brailas et al. |
| 2007/0013518 A1 | 1/2007 | Howarth |
| 2007/0027966 A1 | 2/2007 | Singhal et al. |
| 2007/0080784 A1 | 4/2007 | Kim et al. |
| 2007/0109100 A1 | 5/2007 | Jett et al. |
| 2008/0087730 A1 | 4/2008 | Howarth et al. |
| 2008/0104209 A1 | 5/2008 | Singhal et al. |
| 2008/0197980 A1 | 8/2008 | Howarth et al. |

FOREIGN PATENT DOCUMENTS

| | | |
|---|---|---|
| WO | WO2005-114545 | 12/2005 |
| WO | WO2005-114602 | 12/2005 |
| WO | WO2005-114603 | 12/2005 |
| WO | WO2005-114604 | 12/2005 |
| WO | WO2007-011591 | 7/2006 |
| WO | WO2008-016488 | 2/2008 |

OTHER PUBLICATIONS

The Global Language of Business, retrieved from the internet: http://www.ean-int.org/locations.html, [retrieved Mar. 24, 2005], 5 pages.

Global Location Number (GLN) Implementation Guide, Uniform Code Council, Inc., May 2002, 13 pages.

Lonvick, C., The BSD Syslog Protocol, RFC 3164, Aug. 2001, 28 pages.

Simple Network Management Protocol, Internetworking Technologies Handbook, Chapter-56, printed Jul. 14, 2005, 12 pages.
International Search Report dated Oct. 13, 2005, from (related) International Application No. PCT/US05/16484, 6 pp. including Notification of Transmittal.
Written Opinion of the International Searching Authority dated Oct. 13, 2005, from (related) International Application No. PCT/US05/16484, 5 pp.
Harrington, D., et al, An Architecture for DescribingSimple Network Management Protocol (SNMP) Management Frameworks, RFC 3411, Dec. 2002, 64 pages.
Presuhn, R., Editor, Version 2 of the Protocol Operations for the Simple Network Management Protocol (SNMP), RFC 3416, Dec. 2002, 31 pages.
"Cisco Application-Oriented Networking: A Network-Based Intelligent Message Routing System", http://www.cisco.com/en/US/products/ps6438/products_data_sheet0900aecd802c1f9c.html Data Sheet, Cisco Systems, Inc., Jul. 13, 2005, pp. 1-7.
"Cisco Catalyst 6500 Series Application-Oriented Networking Module", http://www.cisco.com/en/US/products/ps6438/products_data_sheet0900aecd802c1fe9.html Data Sheet, Cisco Systems, Inc., Jul. 13, 2005, pp. 1-3.
"Cisco Application-Oriented Networking—A Network Embedded Intelligent Message Routing System", http://www.cisco.com/en/US/products/ps6438/prod_bulletin0900aecd802c201b.html Product Bulletin No. 2886, Cisco Systems, Inc. Jul. 13, 2005, pp. 1-3.
"Cisco Catalyst 6500 Series Application-Oriented Networking Module: Large Photo", Photo, Retrieved from the internet: http://www.cisco.com/en/US/products/ps6448/prod_view_selector.html [Retrieved Jul. 13, 2005], Cisco Systems, Inc. 1 page.
"The EPCglobal Architecture Framework" EPCglobal Final Version of Jul. 1, 2005, pp. 1-53.
Girardot, Marc and Sundaresan, Neel, "Millau: an encoding format for efficient representation and exchange of XML over the web" [Retrieved Jan. 31, 2005]. Retrieved from the internet: http:www9.org/w9cdrom/154/154.html 25 pages.
Fujitsu Limited, et al., "Web Services Reliability (WS-Reliability) Ver1.0", Jan. 8, 2003. pp. 1-45.
Biloruset, Ruslan et al., "Web Services Reliable Messaging Protocol (WS-ReliableMessaging)", Mar. 2004, pp. 1-40.
Mockapetris, P., "Domain Names—Concepts and Facilities", RFC 1034, Nov. 1987, 43 pages.
Mockapetris, P., "Domain Names—Implementation and Specification", RFC 1035, 55 pages.
US Office Action mailed Aug. 9, 2006 from (related) U.S. Appl. No. 10/866,507.
US Office Action mailed Oct. 6, 2006 from (related) U.S. Appl. No. 10/866,506.
US Office Action mailed Oct. 6, 2006 from (related) U.S. Appl. No. 10/866,285.
US Office Action mailed Nov. 13, 2006 from (related) U.S. Appl. No. 11/073,245, 12 pp.
US Office Action mailed Jan. 18, 2007 from (related) U.S. Appl. No. 10/866,507, 4 pp.
International Search Report dated Feb. 17, 2006, from related International Application No. PCT/US05/15322, 5 pp. including Notification of Transmittal.
Written Opinion of the International Searching Authority dated Feb. 17, 2006, from related International Application No. PCT/US05/15322, 3 pp.
US Office Action mailed Mar. 22, 2007 from (related) U.S. Appl. No. 10/866,506.
US Office Action mailed Apr. 4, 2007 from (related) U.S. Appl. No. 10/866,285.
US Office Action mailed Jun. 18, 2007 from (related) U.S. Appl. No. 11/010,089.
International Search Report dated Jul. 13, 2006 from corresponding PCT patent application No. PCT/US05/16319, including Notification of Transmittal.
Written Opinion of the International Searching Authority dated Jul. 13, 2006, from corresponding PCT patent application No. PCT/US05/16319.

U.S. Office Action mailed Jun. 26, 2007 from U.S. Appl. No. 11/195,160.
Notice of Allowance and Notice of Allowability, mailed Sep. 10, 2007 from U.S. Appl. No. 10/866,506.
Notice of Allowance and Notice of Allowability, mailed Sep. 28, 2007 from U.S. Appl. No. 10/866,507.
Notice of Allowance and Notice of Allowability, mailed Sep. 10, 2007 from U.S. Appl. No. 10/866,285.
Notice of Allowance and Notice of Allowability, mailed. Oct. 11, 2007 from U.S. Appl. No. 11/010,089.
Notice of Allowance and Notice of Allowability, mailed Sep. 19, 2007 from U.S. Appl. No. 11/195,160.
R. Droms, Dynamic Host Configuration Protocol, http://www.ietf.org/rfc/, Bucknell University, Mar. 1997, (RFC 2131), printed Mar. 24, 2005, 43 pages.
S. Alexander et al., DHCP Options and BOOTP Vendor Extensions, http://www.ietf.org/rfc/, Silicon Graphics, Inc., Mar. 1997 (RFC 2132), printed Mar. 24, 2005, 32 pages.
G. Stump et al., The User Class Option for DHCP, http://www.ietf.org/rfc/, IBM, Nov. 2000 (RFC 3004), printed Mar. 24, 2005, 6 pages.
Y. T'Joens, DHCP Reconfigure Extension, http://www.ietf.org/rfc/, Alcatel, Dec. 2001, printed Mar. 24, 2005 (RFC 3203), 6 pages.
M. Patrick, DHCP Relay Agent Information Option, http://www.ietf.org/rfc/, Motorola BCS, Jan. 2001 (RFC 3046), printed Mar. 24, 2005, 14 pages.
EPCgl, Frequently Asked Questions, http://www.epcglobalinc.com/about/faqs.html, printed Mar. 24, 2005, 9 pages.
M. Johnston, DHCP Preboot Execution Environment (PXE) Options draft-ietf-dhc-pxe-options-01.txt, Dynamic Host Configuration Working Group, Intel Corporation, Jan. 21, 2005, 7 pages.
R. Johnson, TFTP Server Address DHCP Option draft-raj-dhc-tftp-addr-option-00.txt, Network Working Group, Cisco Systems, Inc., Feb. 6, 2005, 7 pages.
J. Littlefield, Vendor-Identifying Vendor Options for Dynamic Host Configuration Protocol version 4 (DPHCPv4), Network Working Group, Request for Comments: 3925, Category: Standards Track, Cisco Systems, Inc., Oct. 2004, 9 pages.
H. Schulzrinne, Dynamic Host Configuration Protocol (DHCPv4 and DHCPv6) Option for Civic Addresses Configuration Information draft-ietf-geopriv-dhcp-civil-05, Columbia University, Feb. 19, 2004.
J. Polk et al., Dynamic Host Configuration Protocol Option for Coordinate-based Location Configuration Information, Network Working Group, Request for Comments: 3825, Category: Standards Track, Cisco Systems, Jul. 2004, 15 pages.
AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005, 3 pages.
WhereNet, Products, http://wherenet.com/products_main.html, printed Apr. 16, 2005, 2 pages.
Australian Examination Report dated Apr. 17, 2009 issued in AU 2005246794.
Canadian Examination Report dated Nov. 17, 2008 issued in CA2565099.
Canadian Examination Report dated Feb. 4, 2008 issued in CA2565099.
Canadian Examination Report dated Feb. 1, 2008 issued in CA 2,565,456.
Chinese Office Action (first) dated Feb. 29, 2008 issued in CN1954327 [CN200580015167.4].
Chinese Office Action (second) dated Aug. 15, 2008 issued in CN1954327 [CN200580015167.4].
Chinese Office Action (third) dated Feb. 20,2009 issued in CN1954327 [CN200580015167.4].
Chinese Office Action (first) dated Feb. 29, 2008 issued in CN1954329 [CN200580015169.3].
Chinese Office Action (second) dated Aug. 15, 2008 issued in CN1954329 [CN200580015169.3].
Chinese Office Action (first) dated Feb. 29, 2008 issued in CN200580015168.9.
Chinese Office Action (second) dated Aug. 15,2008 issued in CN200580015168.9.

PCT International Preliminary Examination Report dated Nov. 14, 2006 issued in W02005114545 [PCT/U52005/016484].
PCT Written Opinion dated Nov. 8, 2005 issued in W02005114545 [PCT/US2005/016484].
PCT International Preliminary Examination Report dated Nov. 14, 2006 issued in W02005-114602 [PCT/US2005/015322].
PCT International Search Report dated May 19, 2008 issued in W02006107613 [PCT/US2007/16321].
PCT International Preliminary Examination Report dated Nov. 14, 2006 issued in W02005-114603 [PCT/U52005/016319].
PCT International Preliminary Examination Report dated Oct. 3, 2007 issued in W02005114604 [PCT/US2005/016958].
PCT International Search Report dated Mar. 6, 2008 issued in W02007011591 [PCT/US2006/026970].
PCT Written Opinion dated Mar. 6, 2008 issued in W02007011591 [PCT/US2006/026970].
PCT International Preliminary Examination Report dated Mar. 17, 2009 issued in W02007011591 [PCT/US2006/026970].
US Office Action dated Oct. 6, 2006 issued in U.S. Appl. No. 10/866,506.
US Office Action Final dated Mar. 22, 2007 issued in U.S. Appl. No. 10/866,506.
US Notice of Allowance dated Sep. 10, 2007 issued in U.S. Appl. No. 10/866,506.
US Notice of Allowance dated Jun. 1, 2009 issued in U.S. Appl. No. 11/954,721.
US Notice of Allowance dated Feb. 11, 2009 issued in U.S. Appl. No. 11/954,721.
US Office Action dated Aug. 13, 2008 issued in U.S. Appl. No. 11/954,721.
US Office Action dated Jul. 31, 2009 issued in U.S. Appl. No. 10/891,238.
US Office Action dated Mar. 31, 2009 issued in U.S. Appl. No. 11/304,944.
US Notice of Allowance dated Jan. 11, 2008 issued in U.S. Appl. No. 11/010,089.
US Office Action dated Aug. 4, 2009 issued in U.S. Appl. No. 11/496,779.
US Notice of Allowance dated Oct. 11,2007 issued in U.S. Appl. No. 11/010,089.
US Office Action dated May 12, 2008 issued in U.S. Appl. No. 11/104,140.
US Office Action Final dated Oct 6, 2008 issued in U.S. Appl. No. 11/104,140.
US Examiner Interview Summary dated Jan. 14, 2009 issued in U.S. Appl. No. 11/104,140.
US Office Action dated Mar. 4, 2009 issued in U.S. Appl. No. 11/104,140.
US Notice of Allowance and Examiner's Amendment dated Feb. 11, 2009 issued in U.S. Appl. No. 11/119,169.
US Notice of Allowance dated Aug. 31, 2009 issued in U.S. Appl. No. 11/129,709.
US Notice of Allowance dated Apr. 13, 2009 issued in U.S. Appl. No. 11/129,709.
US Notice of Allowance dated Nov. 10, 2008 issued in U.S. Appl. No. 11/129,709.
US Notice of Allowance dated Aug. 8, 2008 issued in U.S. Appl. No. 11/129,709.
US Notice of Allowance dated Mar. 26, 2008 issued in U.S. Appl. No. 11/129,709.
US Office Action dated Nov. 26, 2008 issued in U.S. Appl. No. 11/182,312.
US Examiner's Amendment dated Nov. 7, 2007 issued in U.S. Appl. No. 11/195,160.
US Examiner's Amendment and Supplemental Notice of Allowance dated Oct. 22, 2007 issued in U.S. Appl. No. 11/195,160.
US Supplemental Notice of Allowance dated Sep. 19, 2007 issued in U.S. Appl. No. 11/195,160.
US Office Action dated Jun. 26, 2007 issued in U.S. Appl. No. 11/195,160.
US Office Action dated Jun. 1, 2009 issued in U.S. Appl. No. 11/965,693.
Mohl Dirk S., "IEEE 1588: Running Real-Time on Ethernet; Getting the Right web server—Time to consider Ethernet for I/O," retrieved for Internet at <http://ethernet.industrial-networking.com/articles/i17 real-time.asp>; downloaded on Mar. 10, 2004.
Montague, Jim (2003) "Ethernet Hits Real-Time. . . Really," Control Engineering, Dec. 1, 2003, copyright 2004 Reed Business Information, a division of Reed Elsevier Inc.; retrieved from Internet at <http://www.manufacturing.net/ctl/index.asp?dlayout=articlePrint&-articleID=CA339683>; downloaded on Mar. 1, 2004.
US Final Office Action dated Jun. 10, 2009 from related U.S. Appl. No. 11/182,312.
US Final Office Action dated Sep. 23, 2009 from related U.S. Appl. No. 11/104,140.
US Final Office Action dated Oct. 2, 2009 from related U.S. Appl. No. 11/346,739.
US Final Office Action dated Nov. 2, 2009 from related U.S. Appl. No. 11/965,693.

* cited by examiner

LOCATING AND PROVISIONING DEVICES IN A NETWORK

CROSS-REFERENCES TO RELATED APPLICATIONS

This application claims priority to U.S. Provisional Patent Application No. 60/570,999, entitled "Methods and Devices for Uniquely Provisioning RFID Devices" and filed on May 13, 2004, which is hereby incorporated by reference for all purposes. This application is related to U.S. patent application Ser. No. 10/866,506, entitled "Methods and Devices for Uniquely Provisioning RFID Devices" and filed on Jun. 9, 2004, to U.S. patent application Ser. No. 10/866,507, entitled "Methods and Devices for Locating and Uniquely Provisioning RFID Devices" and filed on Jun. 9, 2004, to U.S. patent application Ser. No. 10/866,285, entitled "Methods and Devices for Assigning RFID Device Personality" and filed on Jun. 9, 2004, to U.S. patent application Ser. No. 10/891,238, entitled "Methods and Devices for Determining the Status of a Device" and filed on Jul. 13, 2004, to U.S. patent application Ser. No. 10/876,410, entitled "System and Method for Automatically Configuring Switch Ports with Appropriate Features" and filed Jul. 21, 2004, to U.S. patent application Ser. No. 11/010,089, entitled "Methods and Devices for Providing Scalable RFID Networks" and filed on Dec. 9, 2004 and to U.S. patent application Ser. No. 11/104,140, filed on Apr. 11, 2005, entitled "Automated Configuration of Network Device Ports" (collectively, the "Cross-Referenced Applications"), all of which are hereby incorporated by reference for all purposes.

BACKGROUND OF THE INVENTION

1. Field of the Invention

The present invention relates to provisioning devices in a network.

2. Description of the Related Art

Bar codes containing a Universal Product Code ("UPC") have become a nearly ubiquitous feature of modern life. The vast majority of products, as well as packages, containers and other elements in the stream of commerce now bear a bar code to allow for convenient tracking and inventory control.

However, bar codes have some drawbacks. Bar codes are "read only," in that they are merely a printed set of machine-readable parallel bars that cannot be updated. Bar codes cannot transmit information, but instead must be read by a scanner. Bar codes must be scanned within a relatively short distance and must be properly oriented for the bar code to be read.

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

Most RFID tags use one of the Electronic Product Code ("EPC" or "ePC") formats for encoding information. EPC codes may be formed in various lengths (common formats are 64, 96 and 128 bits) and have various types of defined fields, which allow for identification of, e.g., individual products as well as associated information. These formats are defined in various documents in the public domain. One such document is EPC Tag Data Standards Version 1.1 Rev 1.24 (EPCglobal® 2004), which is hereby incorporated by reference for all purposes.

One exemplary RFID tag format is shown in FIG. 1. Here, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels. Inductively-coupled RFID tags have acceptable performance levels. These tags include a microprocessor, a metal coil and glass or polymer encapsulating material. Unfortunately, the materials used in inductively-coupled RFID tags make them too expensive for widespread use: a passive button tag costs approximately $1 and a battery-powered read/write tag may cost $100 or more.

Capacitively-coupled RFID tags use conductive ink instead of the metal coil used in inductive RFID tags. The ink is printed on a paper label by an RFID printer, creating a lower-cost, disposable RFID tag. However, conventional capacitively-coupled RFID tags have a very limited range. In recent years, RF engineers have been striving to extend the range of capacitively-coupled RFID tags beyond approximately one centimeter.

In part because of the significant efforts that have been expended in solving the foregoing problems, prior art systems and methods for networking RFID devices are rather primitive. RFID devices have only recently been deployed with network interfaces. Device provisioning for prior art RFID devices is not automatic, but instead requires a time-consuming process for configuring each individual device. Prior art RFID devices and systems are not suitable for large-scale deployment of networks of RFID devices.

Conventional RFID devices also have a small amount of available memory. A typical RFID device may have approximately 0.5 Mb of flash memory and a total of 1 Mb of overall memory. The small memories of RFID devices place restrictions on the range of possible solutions to the problems noted herein. In addition, an RFID device typically uses a proprietary operating system, e.g., of the manufacturer of the microprocessor(s) used in the RFID device.

Moreover, many RFID devices are deployed in a hostile industrial environment (such as a warehouse or factory) by relatively unskilled "IT" personnel. If a device deployed in one location fails, for example, it may simply be removed and replaced by a functioning device that was deployed in another location. Therefore, it would be desirable to provide methods and devices for uniquely and individually identifying RFID devices and their precise location in a network.

Moreover, RFID devices are being deployed with "static" knowledge of where the device was deployed at the original time of deployment. In practice, RFID devices are moved if another device is damaged or not functioning. In general, it is desirable to allow for the movement of RFID devices. However, if an RFID device is moved, prior art systems do not know to what location the RFID device has been moved.

It would also be desirable to provision such RFID devices automatically for their expected use. RFID devices perform different functions and may interface to the upstream systems differently depending on where they are located. The functions they perform, as well as the unique settings to perform those functions, will be referred to herein as the device "personality." It would be desirable not only to identify an RFID device and to determine its location, but also to provision, configure and deploy software and firmware to allow the RFID device to perform various functions and roles based on location. As used herein, "provisioning" a device can include, but is not limited to, providing network configuration, providing personality configuration, incorporating the device into a network database and enabling the device with software (e.g., business process software). It would also be desirable to provide for convenient reprovisioning and personality updates of RFID devices.

SUMMARY OF THE INVENTION

Methods and devices are provided for locating, identifying and provisioning devices in a network. According to some implementations of the invention, a combination of EPC code information and existing networking standards form the basis of identifying and provisioning methods. For example, MAC address information and EPC information can be combined to identify a particular device and its location in a network. Upper-level applications can be notified, for example, that a particular device is available for use.

For implementations using the Dynamic Host Configuration Protocol ("DHCP"), DHCP Options may be used to pass identification, location and provisioning information. For example, selected DHCP Options may be used to indicate a device type, to provide an EPC code uniquely identifying the particular device, indicating the company name using the device and indicating how the device is being used.

In some implementations of the invention, location information included in a DHCPDISCOVER request can be used to determine appropriate configurations for networked devices. In some such implementations, the location information is read from an RFID tag near the networked device and is inserted in the DHCPDISCOVER request. The location information may include any convenient type of absolute or relative coordinate, positioning, cartographic or similar information and/or information from which such information may be derived. Some such implementations of the invention use DHCPINFORM (RFC 2131) and DHCP Options (RFCs 2132 and 3004) to pass current provisioning and personality information. Moreover, some such implementations of the invention use the DHCPFORCERENEW command (RFC 3203) from a DHCP server to initiate an update or to complete reconfiguration, as required.

Some implementations of the invention provide a method of provisioning a device. The method includes these steps: initializing an RFID device; reading RFID tag data from an RFID tag; inserting the RFID tag data in an option field of a DHCPDISCOVER request; and sending the DHCPDISCOVER request to a DHCP server. The RFID device may be any of various types of RFID devices and may be, for example, a wireless RFID device.

The RFID tag data may include location data. The method may include a step of determining, based at least in part on the RFID tag data, a location of the RFID device. The determining step may involve accessing a data structure that includes locations and corresponding RFID device configurations. The determining step may involve accessing a data structure that includes RFID tag data and corresponding location data. The determining step may be performed by the DHCP server or by another device. The other device may be, for example, a lightweight directory access protocol ("LDAP") server.

The method may also include the steps of determining, based in part on the RFID tag data, an appropriate configuration for the RFID device and of provisioning the RFID device according to the appropriate configuration.

Alternative implementations of the invention provide a method of provisioning a wireless device. The method includes these steps: receiving IEEE 802.11b location data from a plurality of wireless access points; determining, based at least in part on the IEEE 802.11b location data, a location of a wireless device; and determining an appropriate configuration for the wireless device according to the location.

The wireless device may be, for example, a manufacturing device, an RFID device, a portable digital assistant or a laptop computer. The method may include the step of configuring the wireless device according to the appropriate configuration. The appropriate configuration may include a device personality.

The IEEE 802.11b location data may be time data and/or signal strength data. The IEEE 802.11b location data may reference system map data.

Other implementations of the invention also provide a method of determining a device configuration. One such method includes the following steps: receiving a DHCP request; determining a location of a device according to information in the DHCP request; and determining, based at least in part on the location, an appropriate configuration for the device. The method may also involve configuring the device according to the appropriate configuration.

The location determining step may involve determining a location encoded in the DHCP request. Alternatively, the location determining step may involve accessing a data structure and mapping the information in the DHCP request to corresponding location data in the data structure.

Yet other aspects of the invention provide a method for deploying an uniquely-provisioned RFID device in a network. The method includes these steps: reading location information from a first RFID tag; forming a DHCPDISCOVER request that includes an electronic product code of an RFID reader and the location information; sending the DHCPDISCOVER request to a DHCP server; receiving provisioning information from the DHCP server that enables a desired functionality according to an identity and a location of the RFID reader; and provisioning the RFID reader according to the provisioning information, thereby enabling the RFID reader to read nearby RFID tags and to transmit RFID tag information to an RFID network.

For example, the location information could indicate that the RFID reader is positioned near an exit door of a retail store and the RFID tag information may include information regarding products. The method can also include the step of using the RFID tag information to automatically update a database maintained by the retail store. The method could include the step of using the RFID tag information to cause a financial account to be debited for a cost of the products. The RFID tag information could include shopper information.

Alternatively, the location information could indicate that the RFID reader is positioned near a door of a warehouse and the RFID tag information may include information regarding products.

The method could also include the step of using the RFID tag information to automatically update a database maintained by a manufacturer or a distributor of at least one of the products. The method could include the step of using the RFID tag information to update a business plan, such as a marketing plan, a manufacturing plan, a distribution plan or a sales plan.

Some embodiments of the invention provide a network, comprising: a plurality of RFID devices; a plurality of switches connecting the RFID devices to the network; and a DHCP server. At least some of the RFID devices comprise: means for reading location information from a first RFID tag; means for forming a DHCPDISCOVER request that includes an electronic product code of an RFID reader and the location information; means for sending the DHCPDISCOVER request to a DHCP server; means for receiving provisioning information from the DHCP server that enables a desired functionality according to an identity and a location of the RFID reader; and means for provisioning the RFID reader according to the provisioning information, thereby enabling the RFID reader to read nearby RFID tags and to transmit RFID tag information to an RFID network.

The DHCP server includes: means for receiving the DHCPDISCOVER request; and means for automatically identifying an RFID device according to a media access control ("MAC") address and an electronic product code included in the DHCPDISCOVER request and for locating the RFID device according to the location information included in the DHCPDISCOVER request; and means for providing the RFID device with a desired functionality according to a device location and identity.

Still other implementations of the invention provide a method of provisioning a device The method includes these steps: initializing a device; obtaining location data; inserting the location data in an option field of a DHCPDISCOVER request; and sending the DHCPDISCOVER request to a DHCP server.

The device may include Global Positioning System ("GPS") capability and the location data could include GPS data. The device may be an RFID device.

The method may also include the steps of determining provisioning information based at least in part on the location data and providing provisioning information to the device.

The method may also involve receiving provisioning information from the DHCP server; and provisioning the device according to the provisioning information.

In order to secure the command, some implementations provide for a cached secret to be hashed with a client EPC that is included with the DHCP request from the RFID device and the response from the DHCP server. Some implementations employ Domain Name Service ("DNS") and dynamic DNS ("DDNS") to allow easy identification of RFID devices.

Some aspects of the invention provide a method for uniquely provisioning an RFID device. The method includes the following steps: receiving a provisioning request on a network; automatically identifying an RFID device according to a media access control ("MAC") address and an electronic product code ("EPC") included in the provisioning request; automatically locating the RFID device according to location information included in the provisioning request; and automatically providing the RFID device with a desired functionality according to an identity and a location of the RFID device. The method may be performed by a network device such as a DHCP server.

The method may include the step of comparing information in the provisioning request with other information, in order to validate the RFID device. The method may also include the steps of determining whether the RFID device has previously booted and/or of determining whether provisioning information has previously been established for the RFID device.

The RFID device may be provisioned according to provisioning information that has previously been established for the RFID device. The RFID device may be categorized as an untrusted device if it is determined that provisioning information has not previously been established for the RFID device.

Alternative aspects of the invention provide another method for uniquely provisioning an RFID device. The method includes the following steps: forming a DHCPDISCOVER request that includes an EPC of an RFID device and location information indicating a location of the RFID device; sending the DHCPDISCOVER request to a DHCP server; and receiving provisioning information from the DHCP server that is specifically intended for the RFID device. The provisioning information enables a desired functionality according to an identity and a location of the RFID device.

The forming step may involve including the EPC in an Option field (e.g., Option 61) of the DHCPDISCOVER request. The forming step may involve including information (e.g., in Option 60) of the DHCPDISCOVER request that indicates that the DHCPDISCOVER request comes from an RFID device. The forming step may also involve including information in the DHCPDISCOVER request that indicates a name of a company that provides, owns or operates the RFID device. Moreover, the forming step may involve including information (e.g., in Option 77) of the DHCPDISCOVER request regarding a current personality of the RFID device that formed the DHCPDISCOVER request.

An RFID device may include the EPC during a first part of the forming step. A relay agent may include the location information in the DHCPDISCOVER request during a second part of the forming step. Alternatively, the RFID device may include the location information in the DHCPDISCOVER request.

Some embodiments of the invention provide an RFID device, including: a flash memory; a processor configured to form a DHCPDISCOVER request that includes an EPC of an RFID device in Option 43, according to instructions in the flash memory; and a network interface for sending the DHCPDISCOVER request to a DHCP server.

Other embodiments of the invention provide a computer program embodied in a machine-readable medium, the computer program including instructions for controlling one or more elements of an RFID network to perform the following steps: form a DHCPDISCOVER request that includes an EPC of an RFID device and location information indicating a location of the RFID device; send the DHCPDISCOVER request to a DHCP server; and receive provisioning information from the DHCP server that enables a desired functionality according to an identity and a location of the RFID device.

Still other embodiments of the invention provide a computer program embodied in a machine-readable medium, the computer program including instructions for controlling a network device to perform the following steps: receive a provisioning request on a network; identify an RFID device according to a MAC address and an EPC included in the provisioning request; locate the RFID device according to location information included in the provisioning request; and provide the RFID device with a desired functionality according to an identity and a location of the RFID device.

Yet other aspects of the invention provide methods for deploying an RFID device in a network. One such method includes the following steps: forming a DHCPDISCOVER request that includes an EPC of an RFID reader and location information indicating that the RFID reader is positioned at an exit door of a retail store; sending the DHCPDISCOVER request to a DHCP server; receiving provisioning information from the DHCP server that enables a desired functionality according to an identity and a location of the RFID reader; and provisioning the RFID reader according to the provisioning information, thereby enabling the RFID reader to read RFID tags passing through the exit door and to transmit RFID tag information to an RFID network. The RFID tag information may include product information and/or shopper information. The desired functionality may vary over time and may be updated accordingly.

The method may involve the step of using the RFID tag information to cause a financial account to be debited for the cost of the products. The RFID tag information may be used to automatically update a database maintained by the retail store and/or a database maintained by a manufacturer/producer, wholesaler and/or a distributor of at least one of the products. The RFID tag information may be used to update a business plan, such as a marketing, manufacturing, distribution or sales plan.

Still other embodiments of the invention provide an RFID network, including: a plurality of RFID devices; a plurality of switches connecting the RFID devices to the RFID network; and a DHCP server. In some such embodiments, at least some of the RFID devices are configured to do the following: form a DHCPDISCOVER request that includes an EPC of an RFID device; send the DHCPDISCOVER request to the DHCP server via a switch; and receive provisioning information from the DHCP server that is specifically tailored for the RFID device. The switch is configured to add location information to the DHCPDISCOVER request indicating a location of the RFID device. The DHCP server is configured to do the following: receive a DHCPDISCOVER request; automatically identify an RFID device according to a MAC address and an EPC included in the DHCPDISCOVER request; automatically locate the RFID device according to location information included in the DHCPDISCOVER request; and provide the RFID device with a desired functionality according to a device location and identity.

The desired functionality may vary over time and may be updated accordingly, e.g. by using the DHCPFORCERENEW command (RFC 3203) from a DHCP server to initiate an update or to complete reconfiguration.

The methods of the present invention may be implemented, at least in part, by hardware and/or software. For example, some embodiments of the invention provide computer programs embodied in machine-readable media. The computer programs include instructions for controlling one or more devices to perform the methods described herein.

DETAILED DESCRIPTION OF THE INVENTION

Figure 1:
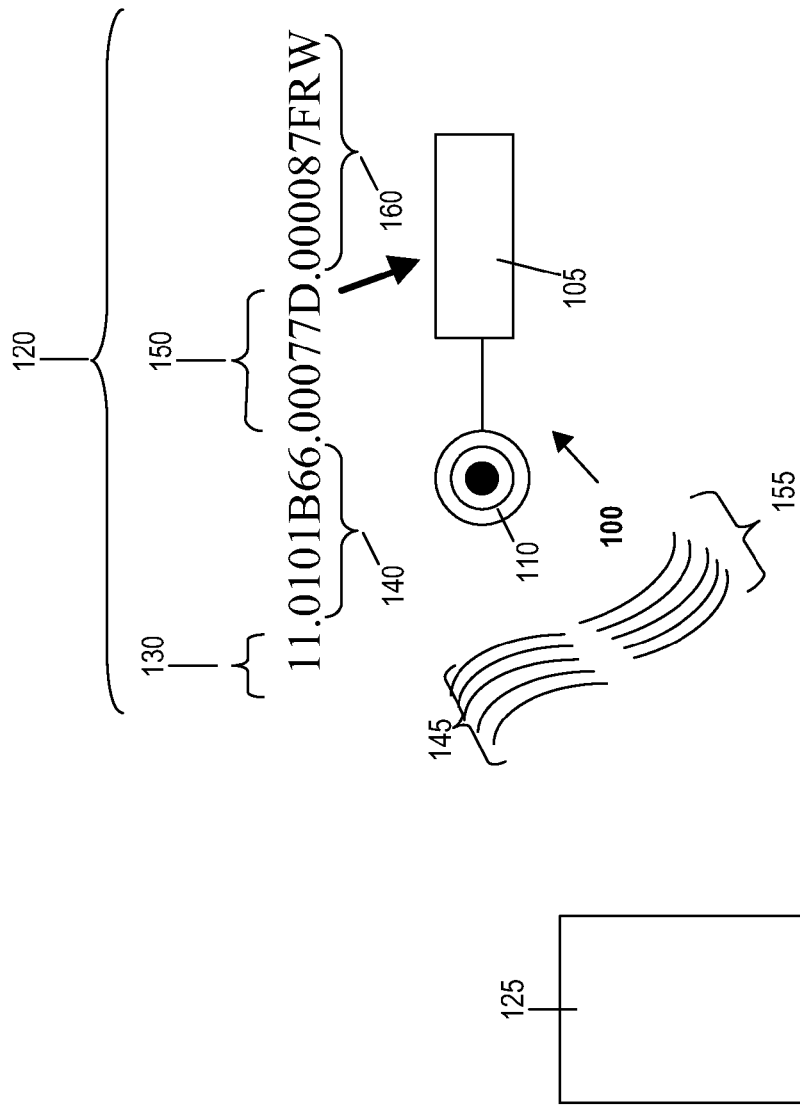
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Although the present invention involves methods and devices for locating, identifying and provisioning individual RFID devices in a network, many aspects of the present invention can be applied to identifying and provisioning other types of devices in a network. For example, the present invention may also be used for locating, identifying and provisioning manufacturing devices, IPphones, portable digital assistants and other networked devices, including wireless and wired devices. Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options may advantageously be used to implement the present invention.

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Using the devices and methods of the present invention, RFID tags and associated RFID devices (such as RFID readers and printers) can form part of a network for tracking a product and its history. For example, instead of waiting in a checkout line to purchase selected products, a shopper who wishes to purchase products bearing RFID tags can, for example, transport the products through a door that has an RFID reader nearby. The EPC information regarding the products can be provided to an RFID network by the reader and can be used to automatically update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Figure 2:
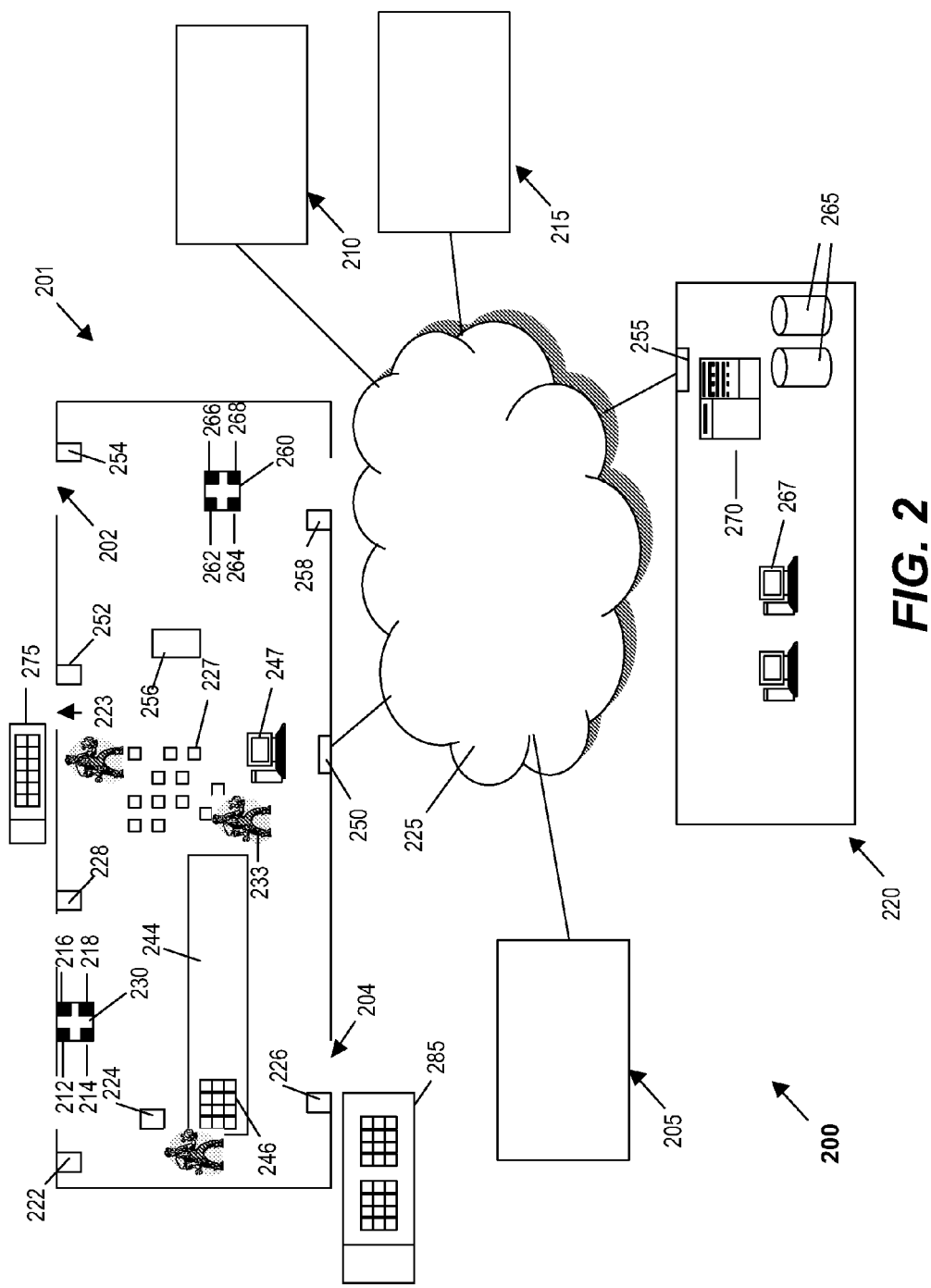
FIG. 2 illustrates an exemplary RFID network according to the present invention.

Some aspects of the invention use a combination of EPC code information and modified versions of existing networking standards for identifying, locating and provisioning RFID devices, such as RFID readers and RFID printers, that are located in a network. An example of such a network is depicted in FIG. 2. Here, RFID network 200 includes warehouse 201, factory 205, retail outlet 210, financial institution 215 and headquarters 220. As will be appreciated by those of skill in the art, network 200 could include many other elements and/or multiple instances of the elements shown in FIG. 2. For example, network 200 could include a plurality of warehouses, factories, etc.

In this illustration, products 227 are being delivered to warehouse 201 by truck 275. Products 227, which already include RFID tags, are delivered through door 225. In this example, RFID reader 252 is connected to port 262 of switch 260. Here, switches 230 and 260 are connected to the rest of RFID network 200 via gateway 250 and network 225. Network 225 could be any convenient network, but in this example network 225 is the Internet. RFID reader 252 reads each product that passes through door 225 and transmits the EPC code corresponding to each product on RFID network 200.

RFID tags may be used for different levels of a product distribution system. For example, there may be an RFID tag for a pallet of cases, an RFID tag for each case in the pallet and an RFID tag for each product. Accordingly, after products 227 enter warehouse 201, they are assembled into cases 246. RFID printer 256 makes an RFID tag for each of cases 246. In this example, RFID printer 256 is connected to port 266 of switch 260. RFID printer 256 could operate under the control of PC 247 in warehouse 201, one of PCs 267 in headquarters 220, or some other device.

RFID reader 224, which is connected to port 214, reads the EPC code of each case 246 and product 227 on conveyor belt 244 and transmits this information on network 200. Similarly, RFID reader 226, which is connected to port 216, reads the EPC code of each case 246 and product 227 that exits door 204 and transmits this information on network 200. Cases 246 are loaded onto truck 285 for distribution to another part of the product chain, e.g., to retail outlet 210.

Each of the RFID devices in network 200 preferably has a "personality" suitable for its intended use. For example, device 252 could cause reassuring tone to sound and/or a green light to flash if an authorized person or object enters door 225. However, device 252 might cause an alarm to sound and/or an alert to be sent to an administrator on network 200 if a product exits door 225 or an unauthorized person enters or exits door 225.

Figure 3:
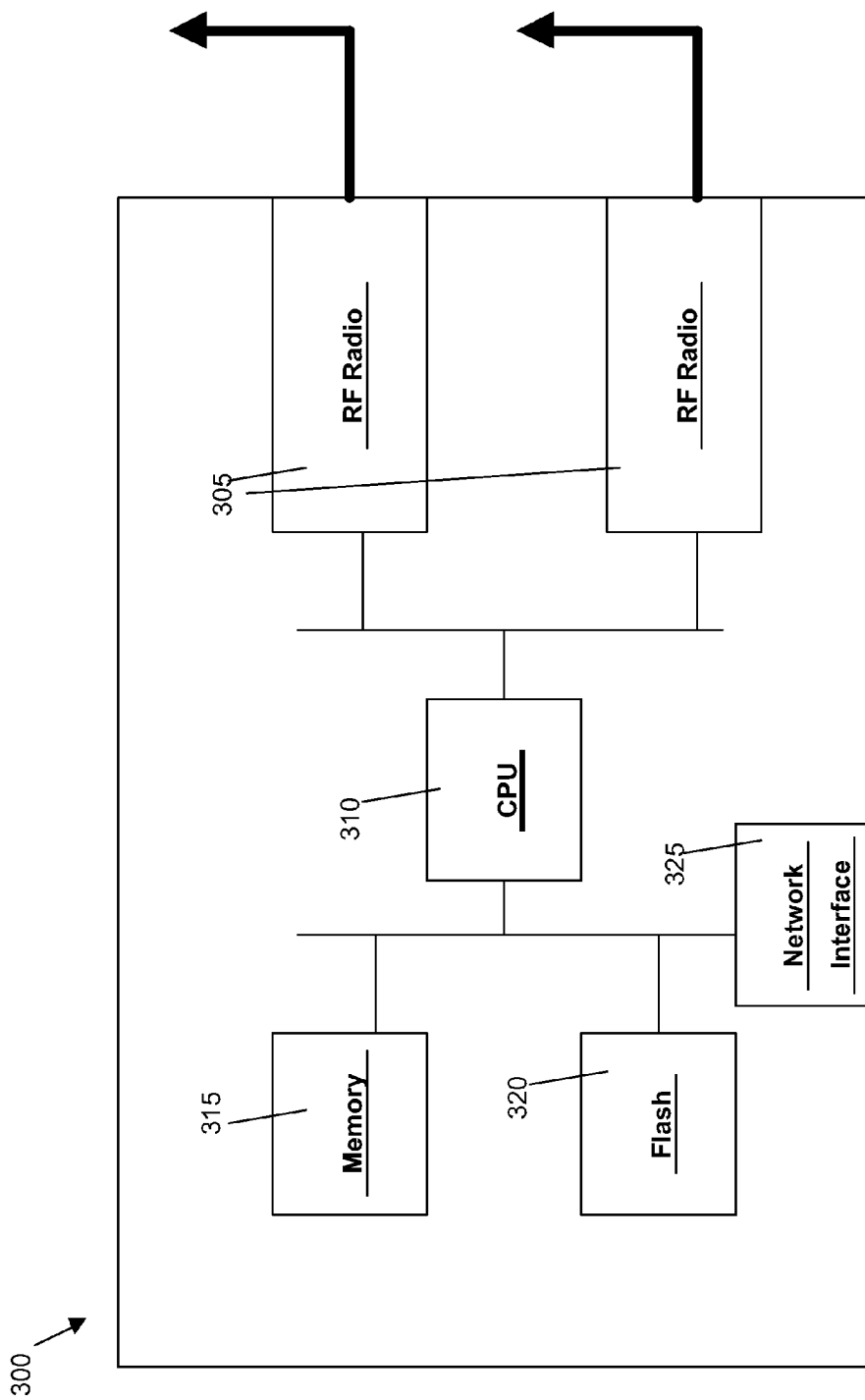
FIG. 3 is a block diagram of an exemplary RFID reader that may be configured to perform some methods of the present invention.

FIG. 3 illustrates an RFID reader that can be configured to perform methods of the present invention. RFID reader 300 includes one or more RF radios 305 for transmitting RF waves to, and receiving modulated RF waves from, RFID tags. RF radios 305 provide raw RF data that is converted by an analog-to-digital converter (not shown) and conveyed to other elements of RFID reader 300. In some embodiments, these data are stored, at least temporarily, by CPU 310 in memory 315 before being transmitted to other parts of RFID network 200 via network interface 325. Network interface 325 may be any convenient type of interface, such as an Ethernet interface.

Flash memory 320 is used to store a program (a "bootloader") for booting/initializing RFID reader 300. The bootloader, which is usually stored in a separate, partitioned area of flash memory 320, also allows RFID reader 300 to recover from a power loss, etc. In some embodiments of the invention, flash memory 320 includes instructions for controlling CPU 310 to form "DHCPDISCOVER" requests, as described below with reference to FIG. 6, to initiate a provisioning/configuration cycle. In some implementations, flash memory 320 is used to store personality information and other configuration information obtained from, e.g., a DHCP server during such a cycle.

However, in preferred implementations, such information is only stored in volatile memory 315 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 315. Updates may be instigated by the central server or selected, trusted devices. New versions of the image file (e.g., the running, base image necessary to operate the RFID device) are copied into flash memory 320. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 4:
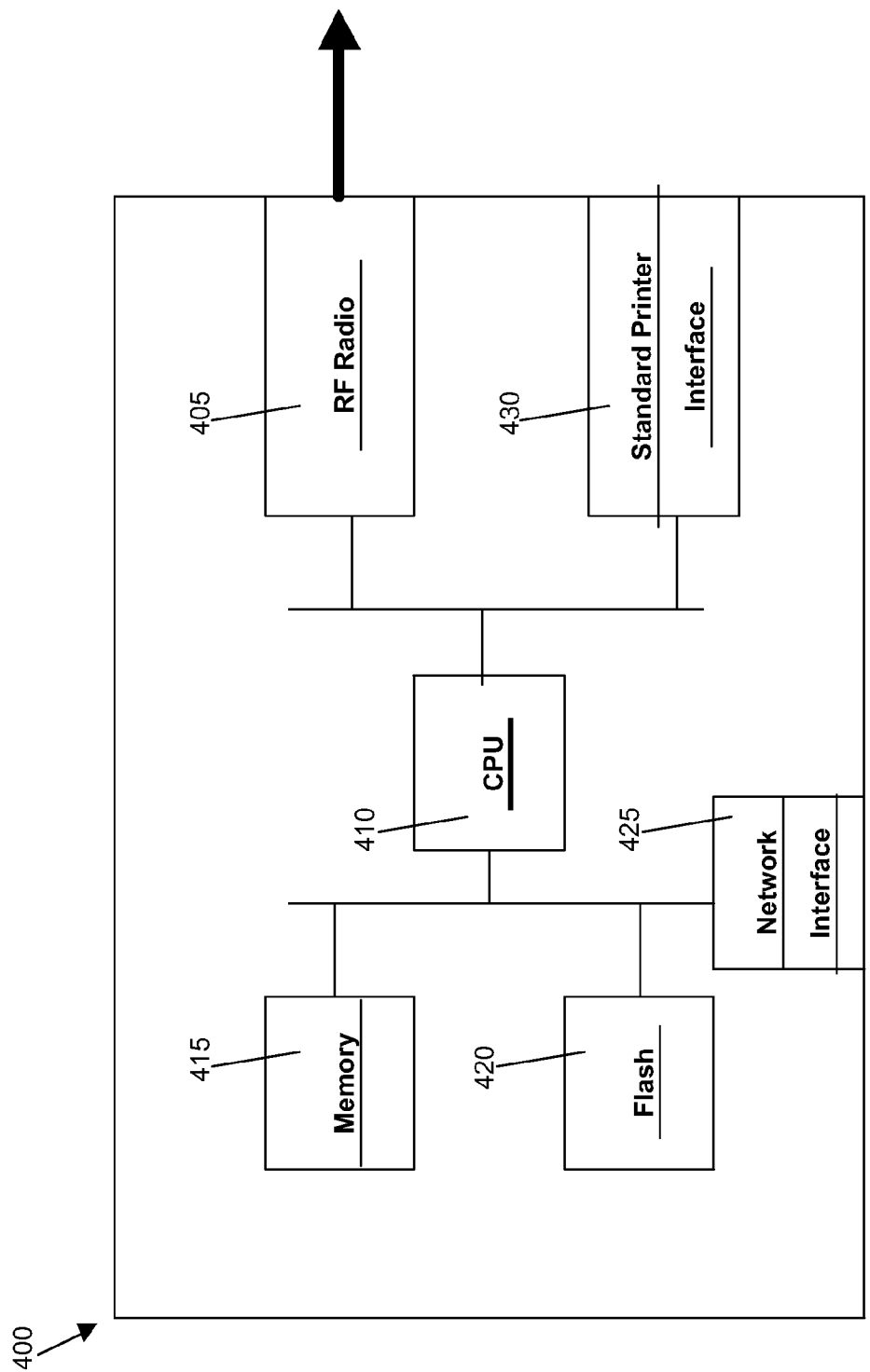
FIG. 4 is a block diagram of an exemplary RFID printer that may be configured to perform some methods of the present invention.

FIG. 4 is a block diagram illustrating an exemplary RFID printer 400 that may be configured to perform some methods of the present invention. RFID printer 400 has many of the same components as RFID reader 300 and can be configured in the same general manner as RFID reader 300.

RFID printer also includes printer interface 430, which may be a standard printer interface. Printer interface prints a label for each RFID tag, e.g. according to instructions received from network 200 via network interface 425.

RF Radio 405 is an outbound radio that is used to send RF signals to the antenna of an RFID tag under the control of CPU 410, thereby encoding information (e.g. an EPC) on the tag's microprocessor. Preferably, RF Radio 405 then checks the encoded information for accuracy. The RFID tag is sandwiched within the label produced by printer interface 430.

Figure 5:
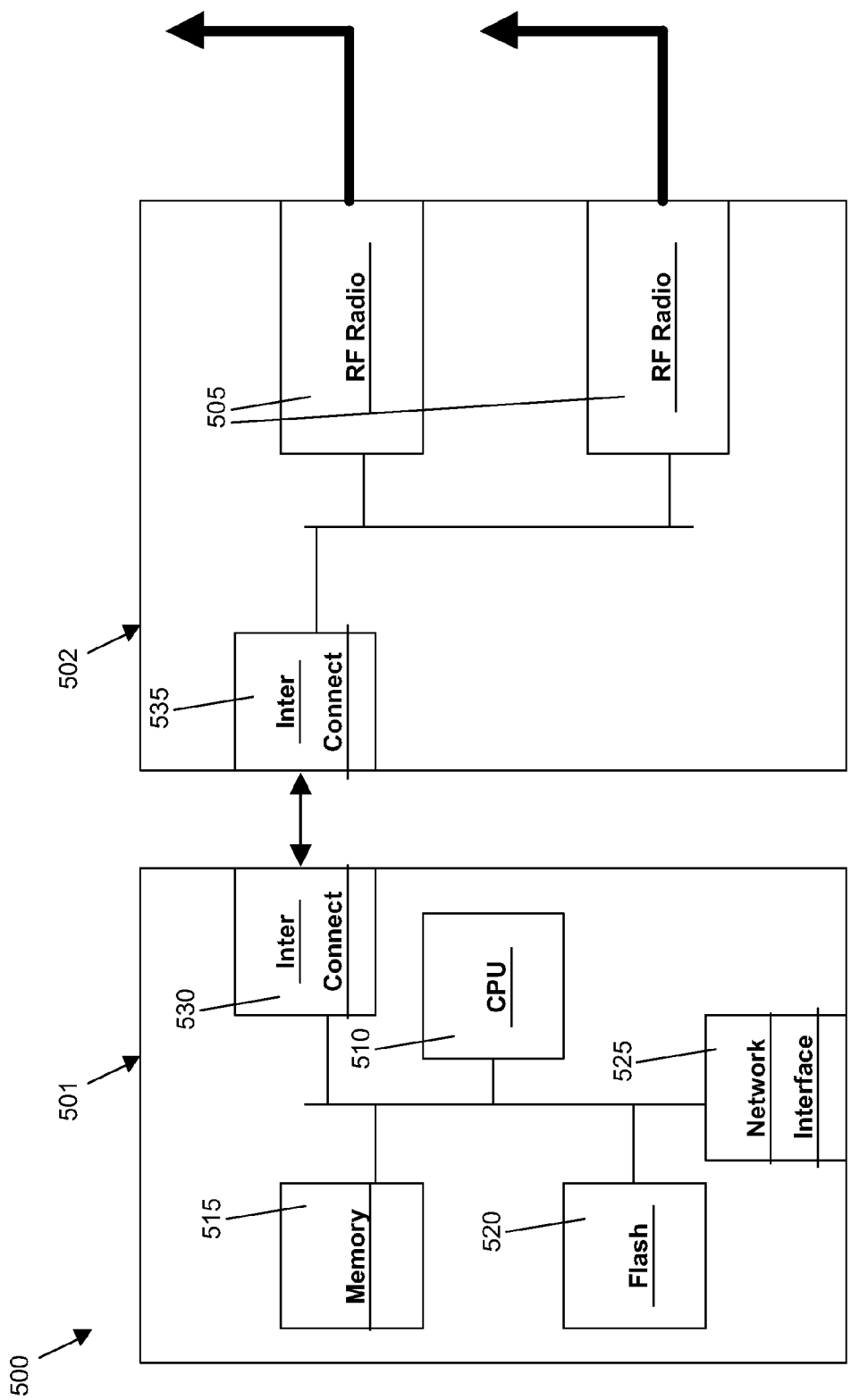
FIG. 5 is a block diagram of an exemplary RFID system that may be configured to perform some methods of the present invention.

FIG. 5 illustrates RFID system 500 that includes control portion 501 and RF radio portion 502. The components of control portion 501 are substantially similar to those described above with reference to FIGS. 3 and 4. Interconnect 530 of control portion 501 is configured for communication with interconnect 535 of RF radio portion 502. The communication may be via any convenient medium and format, such as wireless, serial, point-to-point serial, etc. Although only one RF radio portion 502 is depicted in FIG. 5, each control portion 501 may control a plurality of RF radio portions 502. RFID system 500 may be deployed on a single framework or chassis (e.g., on a forklift) or in multiple chassis.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes.

In some preferred implementations, an EPC corresponding to an RFID device is put inside a DHCP request sent from the RFID device to a DHCP server. The EPC uniquely identifies the RFID device. Some implementations employ Domain Name Service ("DNS") and dynamic DNS ("DDNS") to allow yet easier identification of RFID devices.

Figure 6:
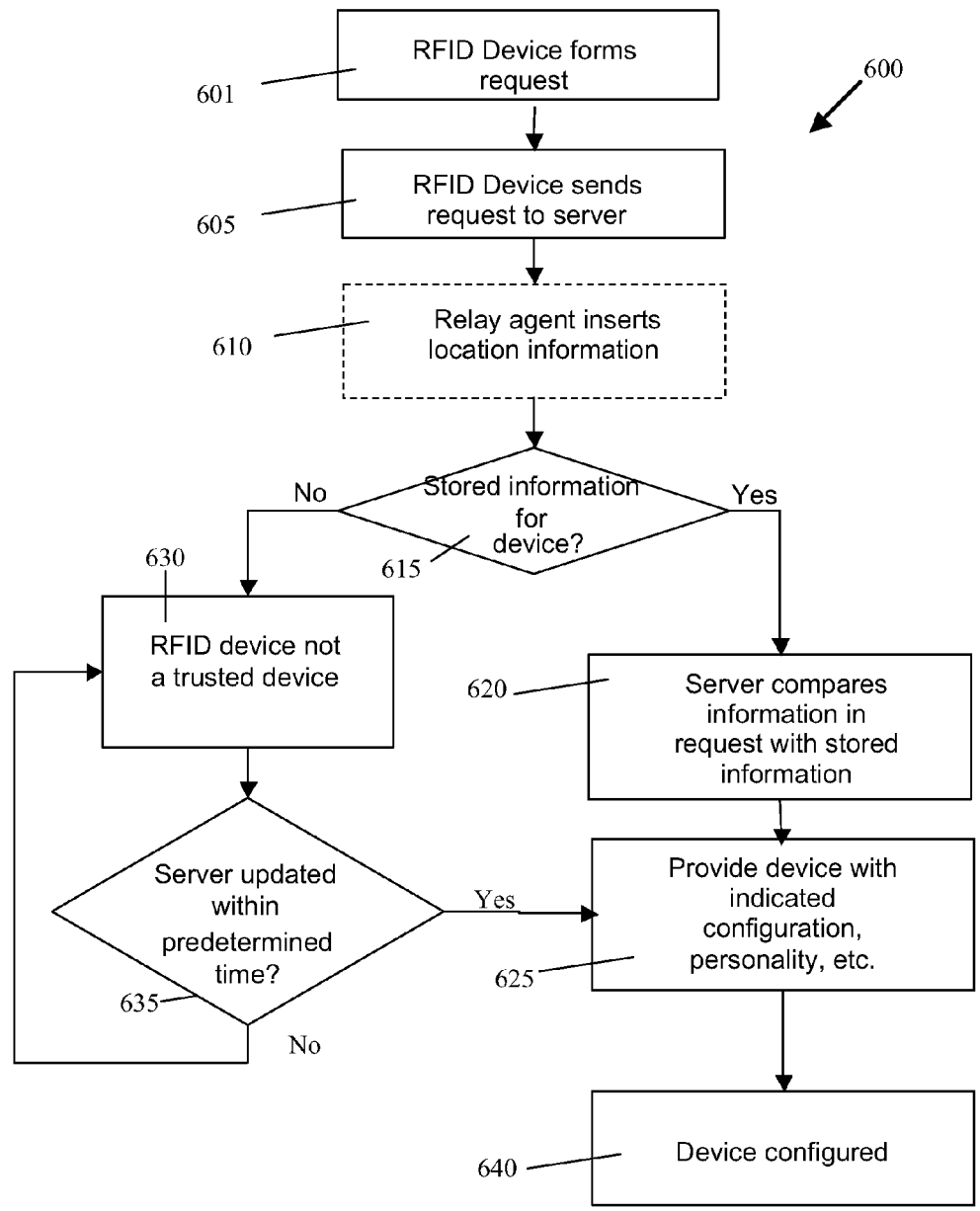
FIG. 6 is a flow chart that provides an overview of some methods of the present invention.

An overview of some such implementations of the present invention will now be described with reference to FIG. 6. It will be appreciated by those of skill in the art that the steps illustrated and described herein are not necessarily performed in the order indicated. Moreover, it will be appreciated that some aspects of the invention may be performed using more (or fewer) steps than are indicated herein. A device that sends out an initiation for an IP address to a DHCP server does so by way of a packet that includes a "DHCPDISCOVER" request. This command includes the media access control ("MAC") address of the device. According to some preferred implementations, the RFID device (e.g., CPU 310 of RFID Reader 300) forms a "DHCPDISCOVER" request packet that includes information in various DHCP Option fields (step 601). The RFID device encodes DHCP "vendor class identifier" Option 60 with a code indicating that the device is an RFID device. In other words, "RFID" will be a new type of "vendor class," encoded in Option 60.

In this example, the RFID device encodes its own EPC in the field reserved for Option 43 (vendor specific information, defined in RFC 2132) or option 125 (vendor-identifying vendor specific information, defined in RFC 3925). The RFID device also encodes a company name, e.g., of the company that supplies, owns or is using the RFID device, in DHCP Option 43.

Option 77 (user class option, defined in RFC 3004) or Option 124 (vendor-identifying class option, defined in RFC 3925) may be used in various ways according to different implementations of the invention. In some implementations, Option 77 or Option 124 will be used to indicate the type of RFID device, e.g., that the RFID device is an RFID reader or an RFID printer. In some implementations, Option 77 or Option 124 can also include information regarding the functionality or "personality" of the RFID device. For example, Option 77 or Option 124 could indicate that the RFID device is an inbound RFID reader, an outbound RFID reader, an RFID reader or printer on an assembly line, a retail store, etc.

Referring once again to FIG. 2, if the request is from RFID device 252, that device would encode information in Option 77 or Option 124 indicating that the device is an RFID reader. In some implementations, Option 77 or Option 124 also indicates that RFID device 252 has a personality suitable for being positioned at an entrance door. Some implementations include more detailed information about the current personality of device 252. For example, Option 77 or Option 124 may indicate that in addition to reading EPC codes and uploading them to the RFID network, device 252 will also cause a green light to flash if an authorized person or object enters door 225 and will cause a red light to flash, an alarm to sound and an alert to be sent to an administrator on the network if a product exits door 225. This information could be encoded, for example, according to a number that corresponds to one of a range of suitable personalities for an RFID reader at an entrance door.

It is desirable to determine and provide location information for RFID devices in a network. Switches and wireless bridges with Ethernet or switch ports are considered static and have assigned names and locations. According to some implementations of the invention, location information is added, for example to an RFID device's DHCPDISCOVER request, by the network device to which the RFID device is attached (step 610).

Some such implementations use DHCP Option 82 (RFC 3046) in a new way to determine the switch port and switch to which an RFID device is connected. For example, a switch may insert the following two information elements into any DHCP request from an attached RFID device: Option 82, Sub-Option 1: Agent Circuit ID and Option 82, Sub-Option 2: Agent Remote ID. The Agent Circuit ID is the name or identifier of the switch. The Agent Remote ID is the name or identifier of the switch port.

For example, if the request is from RFID device 226 of FIG. 2, network device 230 adds location information to the request in step 610. Here, the location information would be encoded in Option 82 and would include information identifying network device 230 and port 216, to which RFID reader 226 is attached.

In alternative embodiments wherein the RFID device is capable of determining its own location (e.g., from GPS coordinates), the RFID device may encode location information in the DHCPDISCOVER request or in other commands.

There can be multiple DHCP servers serving the same network. How the servers respond can depend, for example, on whether each server is busy, whether it has served out all its addresses, etc. As RFID pilot networks emerge and develop, they will be interleaved with existing networks, including networks that employ the DHCP protocol. DHCP servers that are provisioning RFID devices (e.g. server 270 of FIG. 2) will respond to "DHCPDISCOVER" commands identifying a class of the device as."RFID," e.g., encoded in Option 60. Those of skill in the art will appreciate that other Options may be used for this purpose. Conversely, DHCP servers that are not provisioning RFID devices will not respond to "DHCPDISCOVER" commands identifying a class of the device as "RFID." Further, if a non-RFID DHCP server does respond, the RFID device will be able to determine from the DHCP options response that it has received an incomplete DHCP response and will discard it and will prefer responses from RFID DHCP servers. Accordingly, the methods of the present invention allow for the integration of RFID networks within the existing framework of the DHCP protocol.

In step 615, the DHCP server determines whether there is information regarding the requesting device within a database of information regarding known RFID devices, their intended functions, configurations, etc. For example, the DHCP server may inspect the EPC encoded in a request and determine whether there is information for a device with a corresponding EPC in the database.

If so, in step 620, the server compares information in the DHCP request with stored information regarding the RFID device. This information may be in a database (e.g., stored in one of storage devices 265) that is updated, for example, by IT personnel responsible for the RFID network. For example, MAC address information and EPC information can be combined to identify a particular device and its location in a network. Upper-level applications can be notified, for example, that a particular RFID device is available for use.

By inspecting the received data, the server can then determine the type, identity, location and personality (if any) of the RFID device. By comparing the received data with information in the database, the server can then determine, for example, if that precise RFID device has moved and where it is now located. In preferred implementations, the DHCP server may determine the current personality of the RFID device (e.g., by inspecting the Option 77 data) and may compare the current personality with a desired personality.

In step 625, the DHCP server provides the RFID device with configuration information, etc., indicated in the database. For example, the DHCP server may indicate the RFID device's time server, SYSLOG server, the location of the device's configuration files, image files, etc. If the RFID device's current personality does not match the desired personality (or if the request does not indicate a current personality), according to some implementations the DHCP server can provide the device with information (e.g., a computer program, configuration settings, etc.) for enabling the desired personality.

For example, suppose that the EPC code indicates that the device is RFID reader 252 and Option 77 indicates that RFID device 252 has a personality suitable for being positioned at an entrance door. However, the location information in the request may indicate that the requesting device has been moved and is now located at an exit door. Alternatively, the database may indicate that the device is positioned at a door that has been used as an entrance door, but which now will be used as an exit door. This may be a periodic (e.g. hourly, daily, weekly, or monthly) change at a manufacturing facility or warehouse, or may be due to a reconfiguration of the facility.

Therefore, the desired personality for RFID device 252 is now a personality appropriate for an exit door. However, there may be a range of different "exit door" personalities that could be provided to device 252 depending, for example, on the capabilities of the device making the request, the expected uses of the exit door, etc. For example, a device with fewer capabilities (e.g., a smaller memory) may be enabled for relatively simpler exit door functionality. For example, such a device may be enabled to, e.g., make a green light flash when particular type of product is exiting the door and to transmit a notification message to IT personnel and/or cause an alarm to sound if other items are exiting the door.

However, a device with greater capabilities may be enabled for relatively more complex exit door functionality. For example, the device could be enabled to cause a green light to flash if a particular type of product is exiting at an expected time, if the number of products exiting the door is within a predetermined range, etc.

This flexibility in reassigning device personality allows an RFID network to cause the same device type to have multiple personalities based upon location, time of day, or any other suitable criteria. Moreover, this flexibility allows for movement or relocation of devices (whether or not this movement has been approved in advance) and then having devices automatically "repersonalized," as appropriate for the new location. In addition, it allows for specialized functionality on a per device, per locale basis.

However, in some circumstances there may be no information in the database regarding the device. For example, the device may be a new RFID device that has just been activated in the RFID network for the first time (step 630). In this example, the device is placed in a "walled garden" for devices that are not trusted devices. Step 630 may involve assigning the device a non-routable IP address for a predetermined length of time via a DHCPOFFER command. According to some implementations, the DHCP server performs step 630 when there is information in the database regarding the device that is inconsistent with information in the request.

Preferably, step 630 includes notifying an upper-layer application that the device has made the request. In this way, IT personnel responsible for the site within which the RFID device is located will be notified that the RFID device exists and has made a request.

According to some implementations, step 630 involves setting the DHCP T1 timer for a short time interval, for example, 60 seconds. In this example, the RFID device will continue to send DHCP requests to the server every 60 seconds and the server will send "ACKs" to the device until one of two events occurs: (1) the server has been updated (e.g., by IT personnel responsible for the site within which the RFID device is located); or (2) the connection between the server and the RFID device goes down. (Step 635.)

If the server is updated within the predetermined time, this indicates that an IT person has determined that the RFID device making the request is a trusted device. Accordingly, the method proceeds to step 625. If not, the device remains classified as an untrusted device (step 630). Preferably, the device's status may still be changed to that of a trusted (and therefore provisioned) device, e.g., according to subsequent input from IT personnel.

After an initial provisioning configuration cycle (e.g., as described above), RFID devices may need to be reprovisioned or have their personalities changed. As noted above, it is desirable for an RFID device to take on unique provisioning and personalities depending on the desired functionality of the RFID device at a particular time. The desired functionality may be determined according to the location and capabilities of the RFID device. Some devices may be provided with the same personality for a relatively longer time, e.g., months or years. However, it may be desirable to change the personality and/or provisioning information of an RFID device in a relatively shorter time, e.g., prior to the time that a DHCP T1 timer expires. The majority of currently-deployed RFID end devices do not support RFC 3203 (DHCP Reconfigure Extension).

Figure 7:
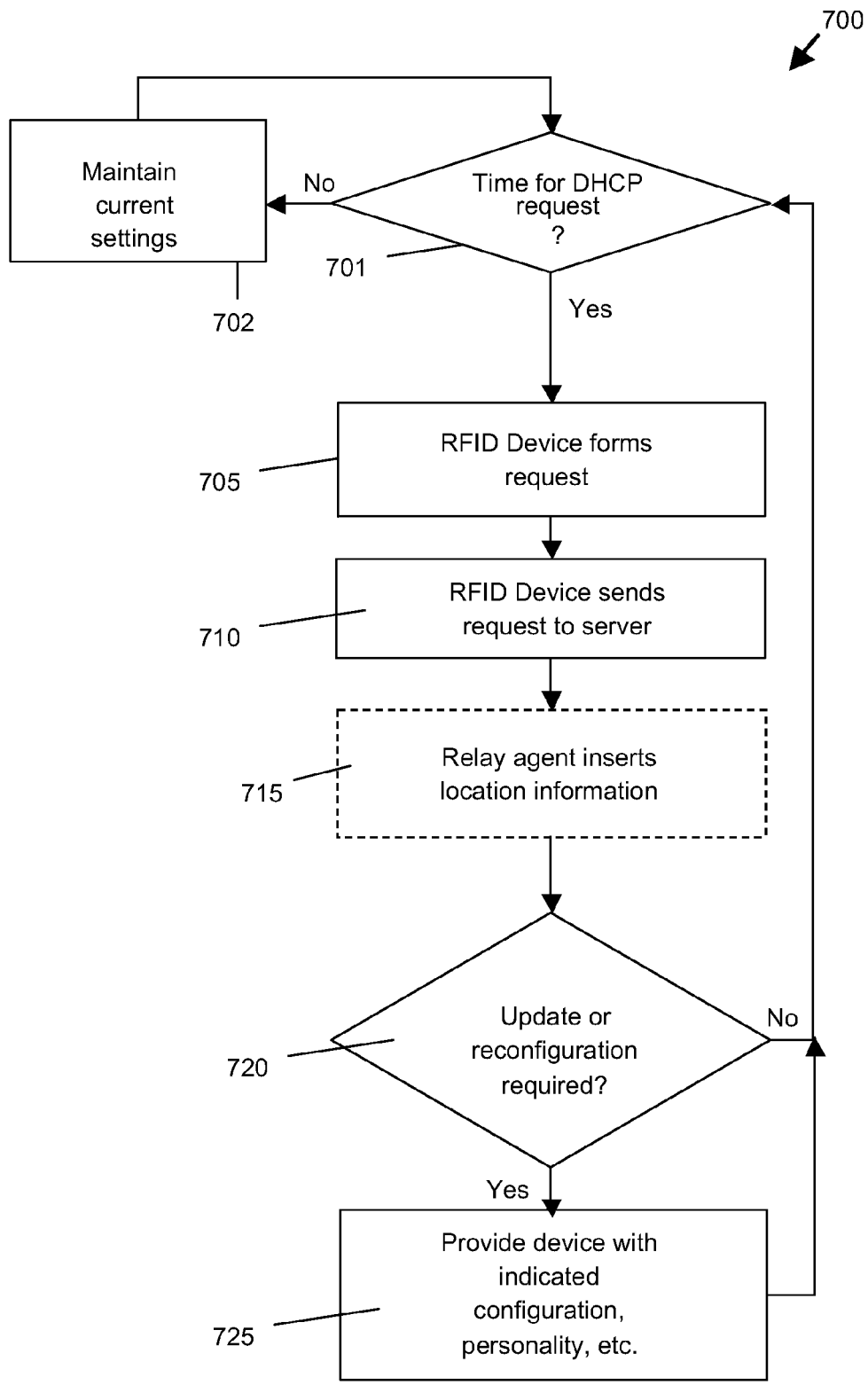
FIG. 7 is a flow chart that provides an overview of alternative methods of the present invention.

The present invention encompasses a variety of methods for accomplishing these goals. One such method will now be described with reference to FIG. 7. Method 700 begins with a determination of whether to send information to a network device regarding the current personality of the RFID device (step 701). Here, the RFID device will send the information to a DHCP server if a predetermined period of time has elapsed. In this example, the predetermined period of time is one hour, but it could be any convenient period of time.

If it is time for another DHCPREQUEST or DHCPINFORM message to be sent to the DHCP server, the RFID device forms the request (step 705). If not, the current personality is maintained (step 702). In this example, the information will be sent in a DHCP request (RFC 2131) combined with DHCP Option 43 set to the RFID device's EPC (or equivalent) and Option 77 set to the RFID device's current personality. Using DHCPREQUEST, DHCPINFORM and DHCP Options, the RFID device is able to pass current identification, provisioning and personality information.

In this example, a cached secret (e.g., hashed with the contents of the DHCP message including the client EPC) will be included with the DHCP request in order to secure the response. The secret could be provided, for example, during an earlier provisioning stage, e.g., the initial provisioning stage of the RFID device. The secret could be used in the DHCPINFORM validation process and for other processes.

The request is sent in step 710. Preferably, a relay agent updates the request with location information, as described above (step 715).

In step 720, the server compares the information in the request with stored information (e.g., in a lookup table or a database) to determine whether an update or a complete reconfiguration of the RFID device is required. If not, the process returns to step 701. If so, the server provides the RFID device with the necessary update and/or reconfiguration information (step 725).

The RFID device triggers the update and/or reconfiguration determination in the foregoing example. However, in other implementations, another device (e.g., the DHCP server) and/or a person initiates this determination. For example, the DHCP server could initiate a periodic process of comparing a desired RFID device personality with the last known RFID device personality. Alternatively, an IT worker could send information (e.g., to the DHCP server, to the RFID device or to another device) indicating a desired change in personality.

According to some implementations of the invention, a DHCP server causes an update or a complete reconfiguration using a DHCPFORCERENEW command as defined by RFC 3203, which is hereby incorporated by reference in its entirety. The CPU of the RFID device registers the ForceRenew command and starts a new provisioning cycle, for example as described above with reference to FIG. 6.

In order to secure the command, in this example a cached secret is hashed within the command. For example, the secret can be included with the EPC code of the RFID device.

One method for creating an authentication key is as follows:

MD-5 (EPC, Challenge, Secret)

By adding in the variable of a random Challenge, no replay attacks of the hash code could be used. Because the EPC is included, the authentication can be further validated to come from a specific device.

The foregoing methods allow for unique determination and provisioning of RFID devices by time of day, not simply by device "type," "class" or "location." Moreover, the foregoing methods allow for ongoing verification/auditing of what the end device roles are. In addition, these methods allow operation managers to have enterprise resource planning systems control end devices to allow for increased functionality.

Figure 8:
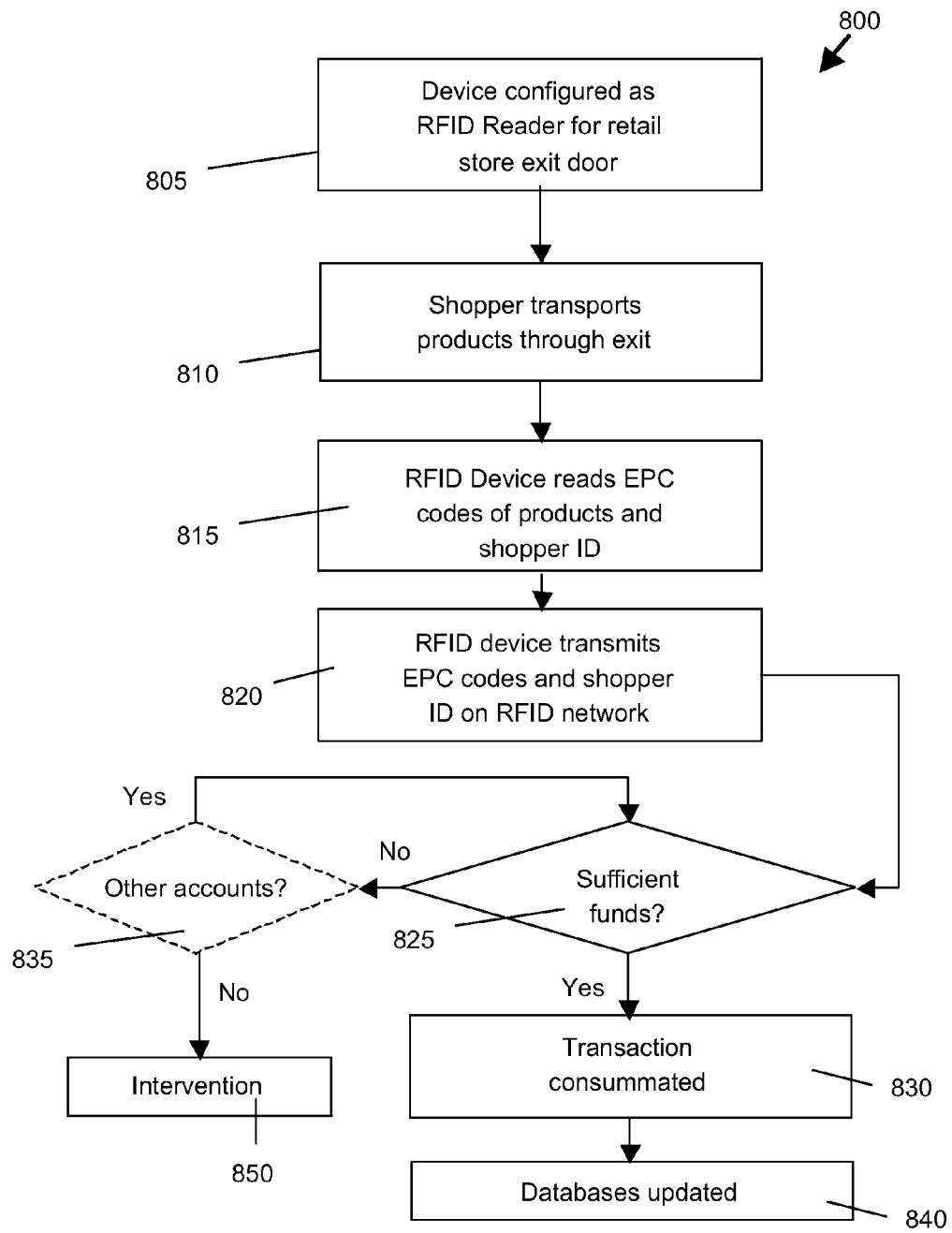
FIG. 8 is a flow chart that provides an overview of some implementations of the present invention.

FIG. 8 is a flow chart that illustrates an exemplary business application of the present invention. Those of skill in the art will appreciate that the example described below with reference to FIG. 8 is but one of many applications of the invention.

In step 805, an RFID device has already been provisioned according to one of the previously-described methods. The condition of the RFID device is comparable to that of a device at step 640 in method 600, shown in FIG. 6 and described above. In this example, the RFID device is an RFID reader that is positioned near an exit door of a retail store. Therefore, in the previous steps, the device has been provisioned with a personality that is appropriate for its role.

In step 810, a shopper exits the door with a number of selected products. In step 815, the RFID reader reads the RFID tags of each product and extracts the EPC codes and related product information (e.g., the price of each product).

The RFID reader also reads an RFID tag that identifies the shopper and the shopper's preferred account(s) that should be debited in order to purchase the products. For example, the shopper may have an RFID tag embedded in a card, a key chain, or any other convenient place in which this information is encoded. The accounts may be various types of accounts maintained by one or more financial institutions. For example, the accounts may be one or more of a checking account, savings account, a line of credit, a credit card account, etc. Biometric data (e.g., voice, fingerprint, retinal scan, etc.) from the shopper may also be obtained and compared with stored biometric data in order to verify the shopper's identity.

In step 820, the RFID reader transmits the product information, including the EPC codes, on the RFID network. In this example, the information is first sent to a financial institution indicated by the shopper's RFID tag.

In step 825, the financial institution that maintains the shopper's selected account determines whether there are sufficient funds (or whether there is sufficient credit) for the shopper to purchase the selected products. If so, the shopper's account is debited and the transaction is consummated (step 830).

In this example, the shopper has the option of designating one or more alternative accounts. Accordingly, if the first account has insufficient funds or credit, it is determined (e.g., by a server on the RFID network) whether there the shopper has indicated any alternative accounts for making purchases (step 835). If so, the next account is evaluated in step 825. If it is determined in step 835 that there are no additional accounts designated by the shopper, in this example some form of human intervention takes place. For example, a cashier of the retail store could assist the shopper in making the purchases in a conventional manner.

If some or all of the products are purchased, information regarding the purchased products (including the EPC codes) are transmitted on the RFID network. For example, this information is preferably forwarded to one or more devices on the RFID network that are configured to update one or more databases maintained by the retail store or the manufacturers/producers, distributors, wholesalers, etc., of the purchased products (step 840). In some implementations, information regarding the shopper is also transmitted on the RFID network (e.g., if the shopper has authorized such information to be released). This product information (and optionally shopper information) may be used for a variety of purposes, e.g., in the formation of various types of business plans (e.g., inventory re-stocking, marketing, sales, distribution and manufacturing/production plans).

Some implementations of the invention provide alternative methods of provisioning devices, including but not limited to RFID devices. Some such methods will now be discussed with reference to FIGS. 9 et seq.

Figure 9A:
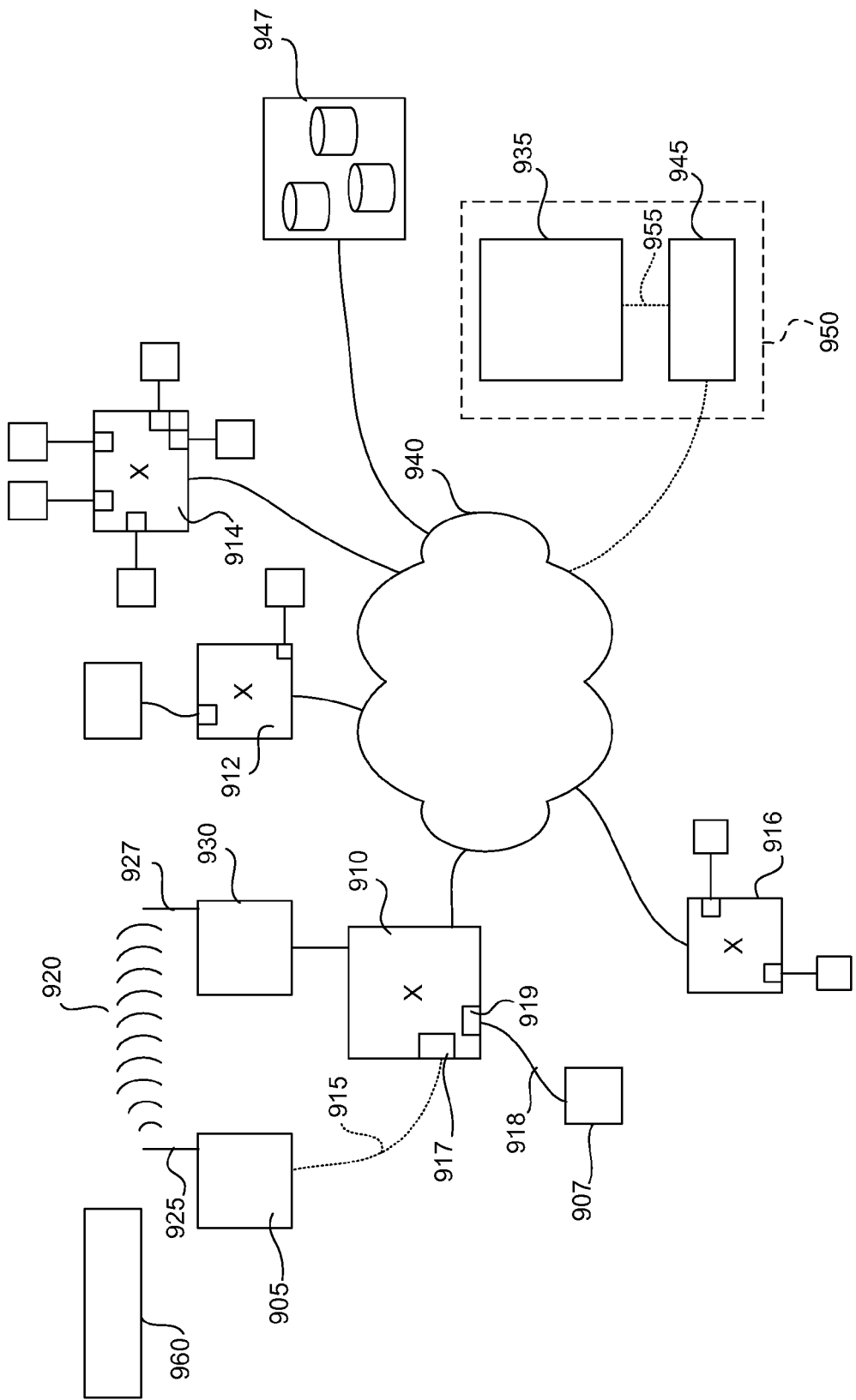
FIG. 9A is a network diagram that illustrates an alternative embodiment of the invention.

In FIG. 9A, RFID reader 905 is in communication with switch 910. This communication may be via a wired link, as illustrated by optional link 915 between RFID reader 905 and port 917. Alternatively, the communication may be via a wireless link, e.g., via wireless link 920 between antenna 925 of RFID reader 905 and antenna 927 of access point 930. RFID device 907 is connected via line 918 to port 919.

Switch 910, as well as switches 912, 914 and 916, can communicate with DHCP server 935 via network 940. Network 940 may be any convenient type of network, but in this illustration at least part of network 940 includes a portion of the Internet.

In some implementations of the invention, DHCP server 935 performs tasks that, in other implementations, are performed by device 945. Device 945 may be one of various types of computing devices, including a host device, a server, etc. In some implementations, device 945 is a Lightweight Directory Access Protocol ("LDAP") server. LDAP is a set of protocols for accessing information directories and is based on the standards contained within the X.500 standard, but is significantly simpler. Unlike X.500, LDAP supports TCP/IP. In some implementations, DHCP server 935 and device 945 are in the same chassis 950. In other implementations, DHCP server 935 and device 945 are in direct communication (as shown by link 955) or communicate via network 940.

Accordingly, RFID reader 905 can read RFID tags (including but not limited to location tag 960) and transmit them to devices in communication with network 940. Preferably, location tag 960 is positioned in a relatively fixed location, e.g., is mounted on a wall, a door frame, or another structural element of a building. In alternative embodiments, location tag 960 is portable.

Location tag 960 includes what will sometimes be referred to herein as "location data," "location information" or the like. The location information may include any convenient type of absolute or relative coordinate, positioning, cartographic or similar information and/or information from which such information may be derived. For example, in some implementations location tag 960 includes latitude/longitude, X,Y coordinate information and/or elevation information. In other implementations, location tag 960 includes "civil address" information, which may include street address, building, floor, room/area and/or other such information.

Alternatively, the location information may be in the form of a code, such as a numerical or alphanumeric code, from which absolute location information (such as coordinate, latitude/longitude, civil address, etc.) may be derived. For example, a data structure accessible by DHCP server and/or device 945 may include codes and corresponding absolute location information. Accordingly, DHCP server and/or device 945 may access the data structure and determine absolute location information that corresponds to a code encoded in location tag 960. The data structure may be a look-up table, a database, etc. The data structure may be stored in a local memory or in one or more of networked storage devices 947.

Location tag 960 may be encoded in any convenient manner, including by proprietary methods and/or methods that conform, at least in part, to existing standards. In general, it is preferable to deploy location tags that are encoded according to existing standards in order to simplify programming of related devices, to avoid non-uniqueness problems and generally to lower the costs of implementing the present invention. Location tag 960 may be formed, e.g., as an RFID tag or as any type of bar code.

Figure 9B:
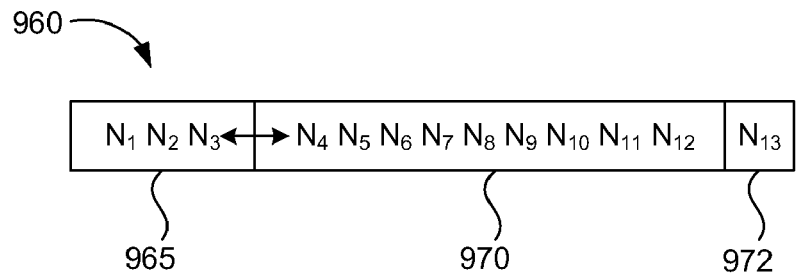
FIG. 9B illustrates a Global Location Number ("GLN").

One example of a format for at least a portion of location tag 960 is shown in FIG. 9B. Here, location tag 960 is in the general format of a Global Location Number ("GLN"). Some exemplary GLN formats are defined, for example, in the "Global Location Number (GLN) Implementation Guide," (Uniform Code Council, 2002), which is hereby incorporated by reference for all purposes. Accordingly, location tag 960 includes a 13-digit GLN. Field 965 is a company prefix field, which indicates the prefix assigned to an entity by the Uniform Code Council or an EAN member organization. Field 972 is a check digit field that contains a one-digit number used to ensure data integrity.

The length of location reference field 970, which is a nine-digit field in this example, varies according to the length of the assigned company prefix field 965. Location reference field 970 may be assigned to identify uniquely a selected location. Accordingly, location reference field 970 may be customized according to an organization's desires and/or requirements. In the example shown in FIG. 9C, location reference field 970 has been defined by an entity to according to a 3-digit building field 975, a 2-digit floor field 980, a 1-digit function field 985 and a 3-digit area field 990. In this example, the location is a particular door in a receiving area of a warehouse.

Figure 10:
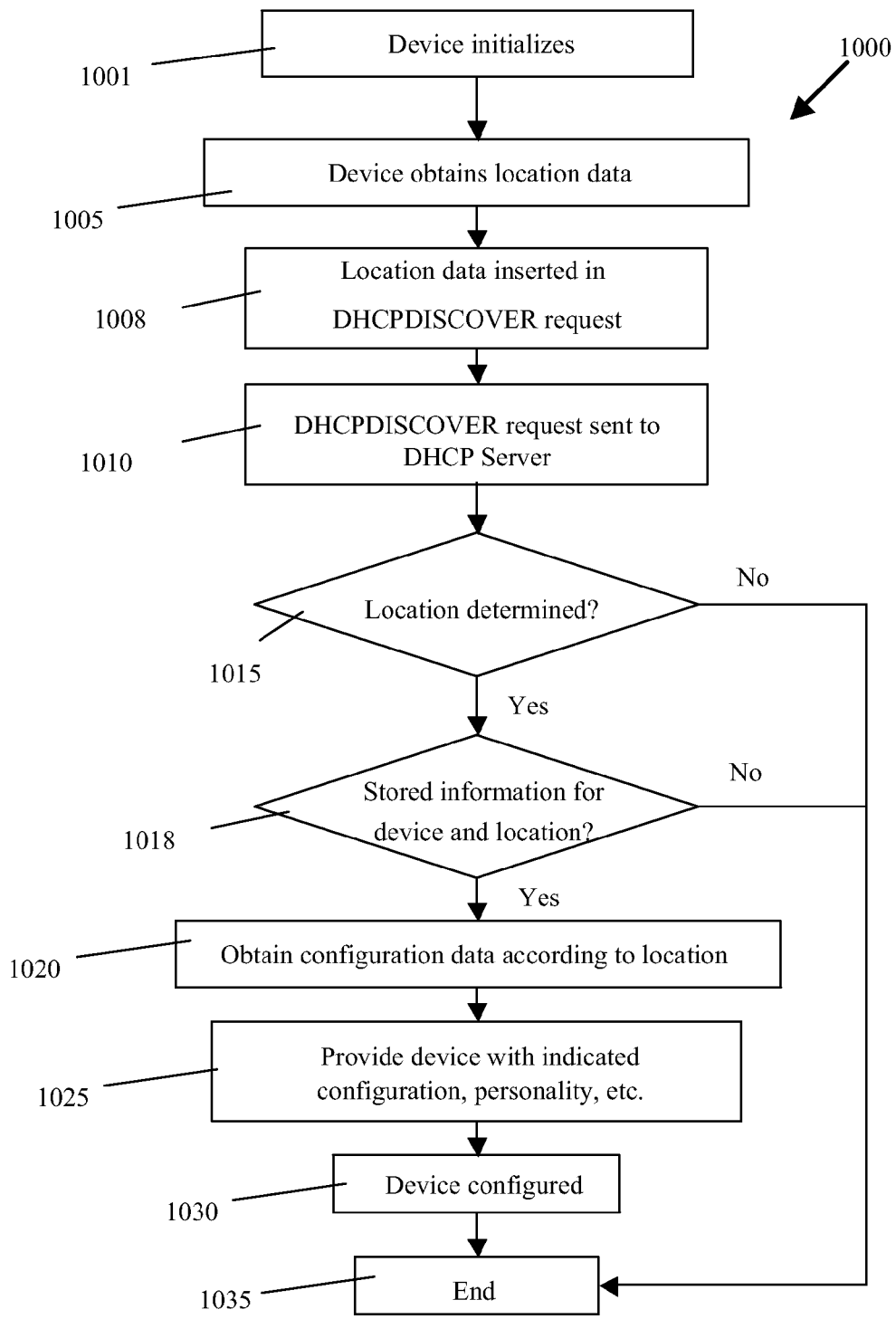
FIG. 10 is a flow chart that outlines an alternative method of the invention.

FIG. 10 is a flow chart that outlines method 1000 according to the invention. In step 1001, a device initializes. According to method 1000, the device obtains location data before the device is configured with an IP address and other network configuration information. (Step 1005.)

In some implementations of the invention, the location data are obtained in step 1005 by reading a location tag that is positioned nearby. Accordingly, location tags have previously been positioned in locations where devices were expected to be used. The identifiers and locations of the location tags have preferably been recorded in a central management system. In some such implementations, when a device (e.g., a wireless RFID reader) is first turned on, the device prompts the user to "swipe" the reader past a location tag. Swiping may not be necessary if, for example, the location tag is an RFID tag and the reader is capable of reading tags at a sufficient distance.

In alternative implementations, the location data are obtained in step 1005 according to other methods, e.g., from an associated device that has Global Positioning System ("GPS") capability. In some such implementations, the device itself includes GPS functionality.

In step 1008, the location data are included in an option field of the DHCPDISCOVER request, for example in option 43 (RFC 2132) or option 125 (RFC 3925). These RFCs are hereby incorporated by reference for all purposes. The DHCPDISCOVER request is then sent to a DHCP server. (Step 1010.)

In step 1015, it is determined whether the device's location can be determined from the location data in the DHCPDISCOVER request. The determining step includes extracting the location data from an option field of the DHCPDISCOVER request. As noted above, in some implementations the location data may be a code that can be used to cross-reference objective location data that could be meaningful for the purpose of device provisioning. In other implementations (e.g., as described above with reference to FIGS. 9B and 9C), such objective location data are encoded in the request itself.

The process of determining and/or evaluating the location data may be performed by the DHCP server itself (e.g., by DHCP server 935 of FIG. 9A) or may be performed, at least in part, by another device (e.g., by device 945 of FIG. 9A). Information relevant to steps 1015, 1018 and 1020 may be stored by one of these devices, by a local storage device or by networked storage devices 947. (See FIG. 9A.) If objective location data can be determined in step 1015, the process continues to step 1018. If not, the process ends.

Figure 9C:
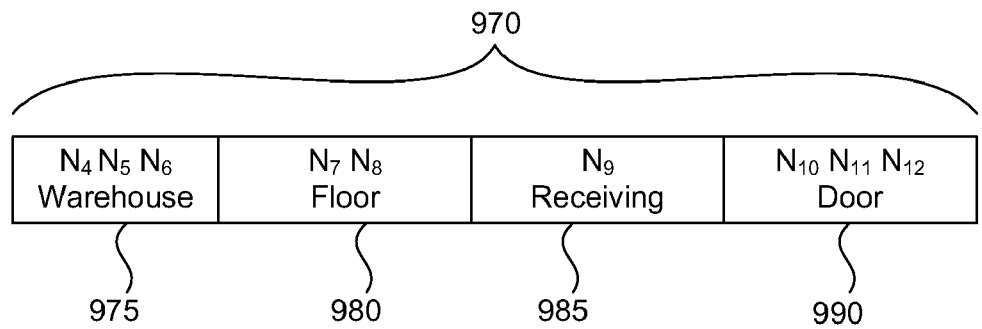
FIG. 9C illustrates one exemplary location reference field of the GLN illustrated in FIG. 9B.

In this example, objective location data were encoded as shown in FIG. 9C and it is determined in step 1015 that the device is located near the indicated receiving door of a particular floor of a warehouse. In step 1018, it is determined whether there are stored configuration data that correspond to the objective location data determined in step 1015. Either step 1015 or step 1018 (in this example, step 1018) also involves determining a device type, e.g., according to methods discussed elsewhere herein. Here, it is determined in step 1018 that the device is a particular type of RFID reader. Moreover, it is determined in step 1018 that configuration data appropriate for that type of RFID device and for the location determined in step 1015 have previously been stored.

Accordingly, in step 1020 an appropriate IP address, other network configuration information and an operating system image for the RFID reader are obtained. Such data will sometimes be collectively referred to herein as "configuration data" or the like. In this example, an appropriate device personality has also been stored. This personality is determined in step 1018 and is provided in step 1020 through a DHCP message exchange. The device is configured accordingly, as described elsewhere herein. (Step 1030.)

Some implementations of the invention use alternative methods of determining a device's location. For example, some methods that are suitable for wireless devices use location determination techniques that are outlined in one or more of the IEEE 802.11 specifications, (e.g., 802.11b), which are hereby incorporated by reference for all purposes.

Figure 11:
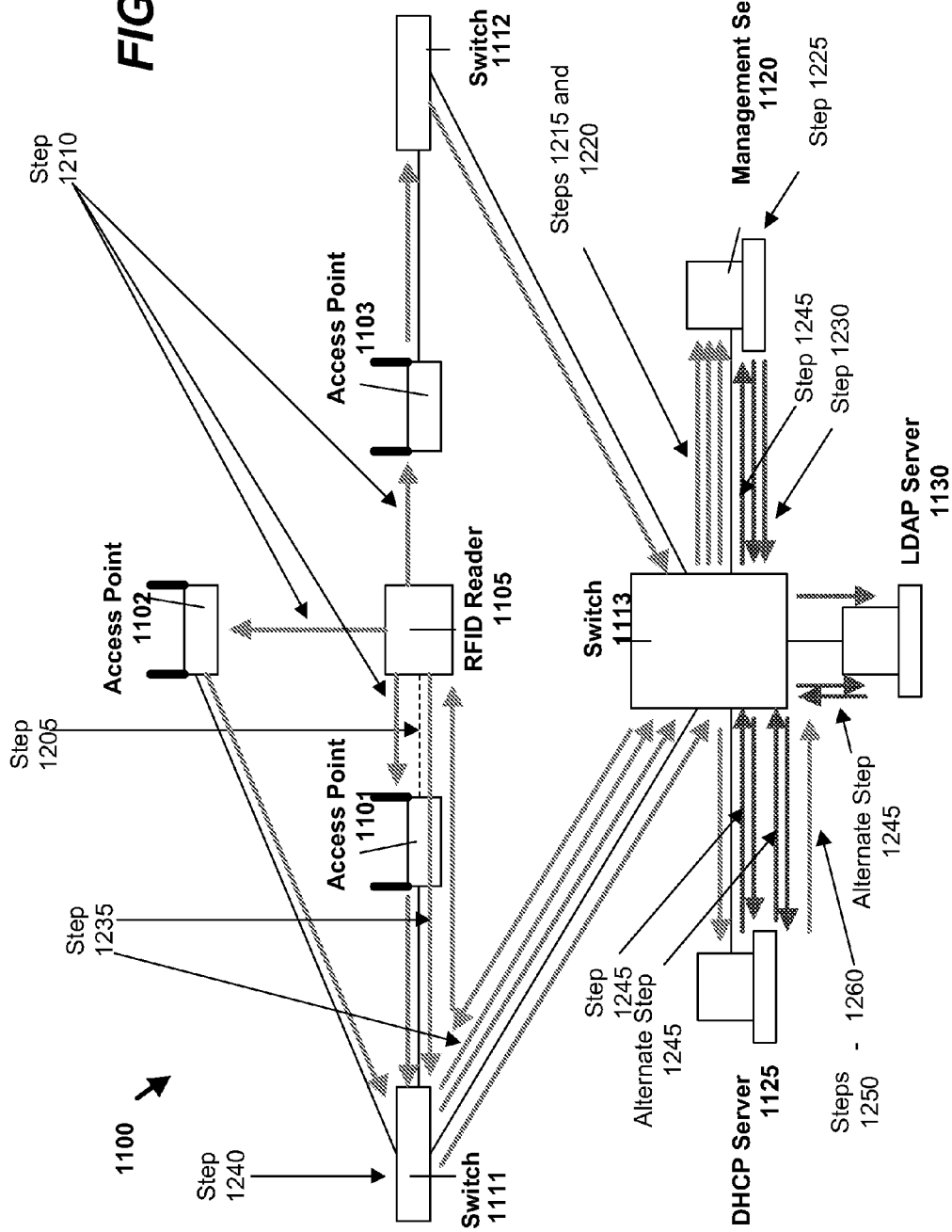
FIG. 11 is a network diagram that illustrates another embodiment of the invention.

Some such implementations will now be described with reference to the network diagram of FIG. 11 and the flow chart of FIG. 12. FIG. 11 depicts wireless device 1105, which is a wireless RFID reader in this example. In alternative implementations, wireless device 1105 may be another type of wireless device, such as a portable digital assistant or a laptop computer having a wireless interface. The signals from wireless device 1105 can be detected by wireless access points ("WAPs") 1101, 1102 and 1103, which are in communication with switches 1111 and 1112.

Figure 12:
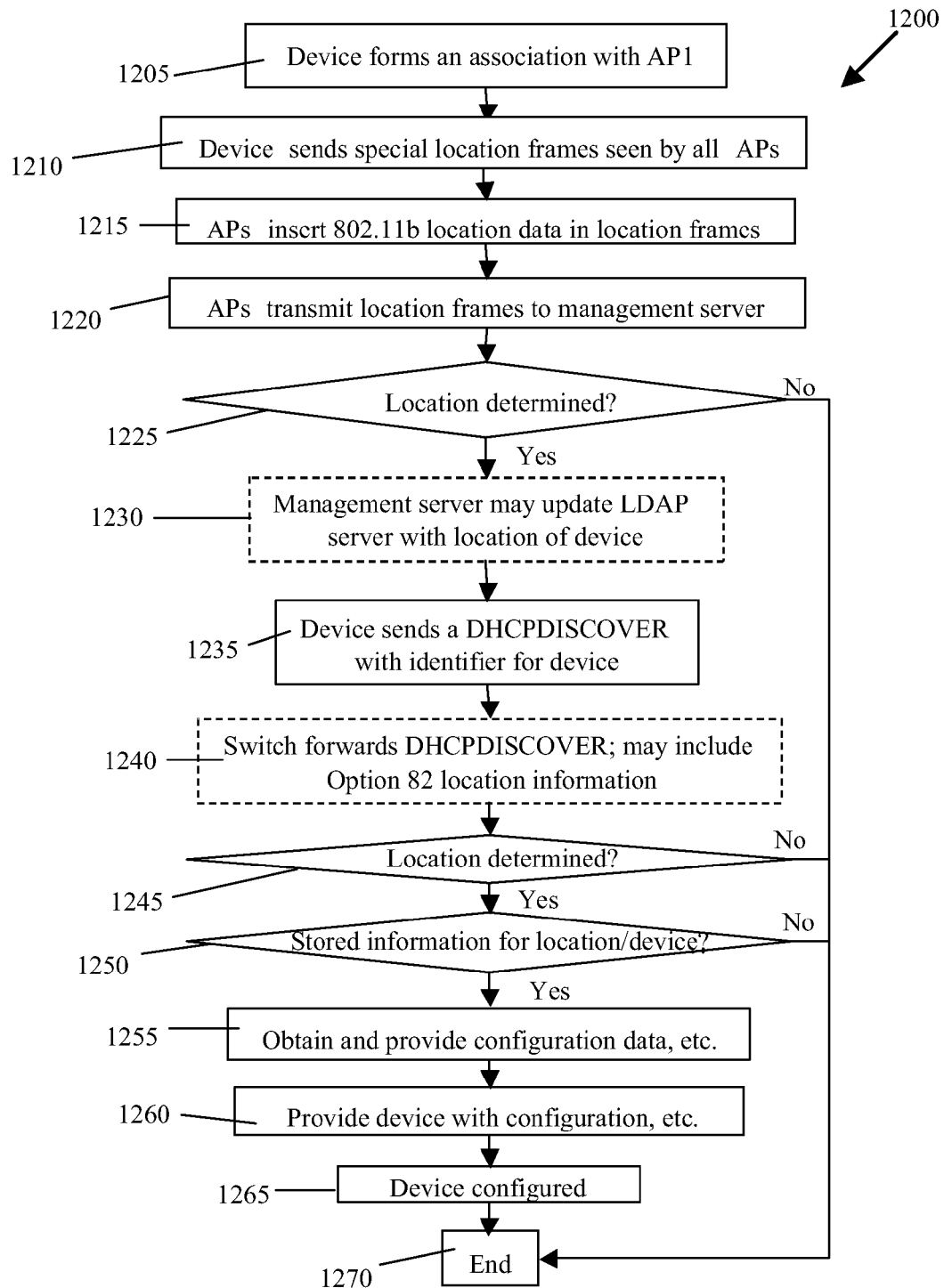
FIG. 12 is a flow chart that outlines yet another method of the invention.

According to method 1200 of FIG. 12, wireless device 1105 initializes and forms an association with access point 1101 (step 1205). All 802.11 devices associate with only a single access point at any one time. Therefore, wireless device 1105 can only associate with a single access point. Access points 1102 and 1103 can "see" wireless device 1105 because a wireless network is a shared medium. However, wireless device 1105 directs its traffic towards access point 1101, with which it has an association.

According to the 802.11b specification, a wireless device will periodically send out a special wireless frame (packet) which is specifically understood to go to all access points. The special frame, which is typically implementation dependent, usually contains an identifier for the particular wireless device. Such special frames will be referred to herein as "location frames" or the like. Accordingly, in step 1210 wireless device 1105 sends out a location frame that is received by access points 1101, 1102 and 1103. The location frame includes an identifier, which could be the MAC address of wireless device 1105, some other identification number, an EPC value coded into the RFID device, etc.

When an access point receives a location frame, the access point forwards the location frame to a management server that aggregates the information from various access points. Each access point may insert a timestamp of when it received the frame and/or the power level (Received Signal Strength Indicator or "RSSI") of the received frame before forwarding it to the management server. These data will sometimes be referred to herein as "IEEE 802.11b location data" or the like.

Such IEEE 802.11b location data may include what could be termed "triangulation data," in that the data may be used to locate the wireless device by triangulation techniques. However, some types of IEEE 802.11b location data are not, strictly speaking, triangulation data. Instead, these data reference other location information, e.g., system map data.

Accordingly, in step 1215, access points 1101, 1102 and 1103 insert IEEE 802.11b location data into the location frames received from wireless device 1105 and forward the location frames to management server 1120. Therefore, management server 1120 will receive multiple frames containing the device identifier for wireless device 1105 from different access points. Although switch 1113 is shown in FIG. 11 to be hard wired to management server 1120, DHCP server 1125, LDAP server 1130 and switch 1111 switch 1113, it will be appreciated by those of skill in the art that this is merely a simple example of how these and other devices of network 1100 may communicate. For example, switch 1113 may communicate with management server 1120, DHCP server 1125, LDAP server 1130 and/or switch 1111 via a network such as an intranet and/or the Internet.

In step 1225, management server 1120 attempts to determine the location of wireless device 1105 using the IEEE 802.11b location data in the location frames. The access points have preferably been mapped into the management server, so their location is known. Based upon the IEEE 802.11b location data (e.g., the RSSI or timestamp) in the special frames, the management server can use algorithms to determine the location of wireless device 1105.

Management server 1120 may show the location of wireless device 1105 on a map that was pre-configured in a management station at the same time the access points were added to the management station. This location could be indicated in terms of a geographical coordinate. Alternatively, or additionally, management server may be configured to designate portions of a map to correspond to a predetermined location name such as "dock door 101" or "back stockroom."

If management server 1120 cannot determine the location of wireless device 1105, method 1200 ends. The location may nonetheless be determined by alternative methods described herein. However, if management server 1120 can determine the location of wireless device 1105, management server 1120 will store the location and may update a memory of another device, e.g., of LDAP server 1130. (Optional step 1230.)

In step 1235, wireless device 1105 sends a DHCPDISCOVER request, with a device identifier, to DHCP server 1125. Unlike the special location frame, the DHCPDISCOVER request only goes to the access point with which wireless device 1105 has an association (access point 1101). Switch 1111, to which access point 1101 is connected, may optionally add location data as described elsewhere herein. For example, switch 1111 may include location data in Option 82. Switch 1111 forwards the DHCPDISCOVER request to DHCP server 1125 via switch 1113. In some implementations, switch 1113 functions as a relay agent and inserts a gateway address in the DHCPDISCOVER request if DHCP server is on a separate IP subnet.

In step 1250, DHCP server 1125 queries management server 1120 and/or LDAP server 1130 to determine whether there is a location corresponding to information (e.g., ID information) in the DHCPDISCOVER request. If not, method 1200 ends.

In one such example, DHCP server 1125 queries management server 1120 for the location of the device upon receiving the DHCPDISCOVER request. DHCP server 1125 could use the MAC address, EPC value or another identifier coded into the DHCPDISCOVER request in order to reference wireless device 1105 to management server 1120. Management server 1120 could return the location of the RFID device to the DHCP server via the network. Depending on the implementation, management server 1120 could return a geographical coordinate or a predetermined location name such as "dock door 101."

DHCP server 1125 could query LDAP server 1130 for such information in a similar fashion. If management server 1120 is updating LDAP server 1130, DHCP server 1125 could obtain these and other data from LDAP server 1130.

If a device location is determined, DHCP server 1125 determines whether there are configuration data, personality data, etc. appropriate for the location and for the device type indicated in the DHCPDISCOVER request as described elsewhere herein. If there are not, method 1200 ends. If such data are found, DHCP server 1125 obtains these data (step 1255) and provides them to wireless device 1105. (Step 1260.) Wireless device 1105 is provisioned accordingly in step 1265.

Figure 13:
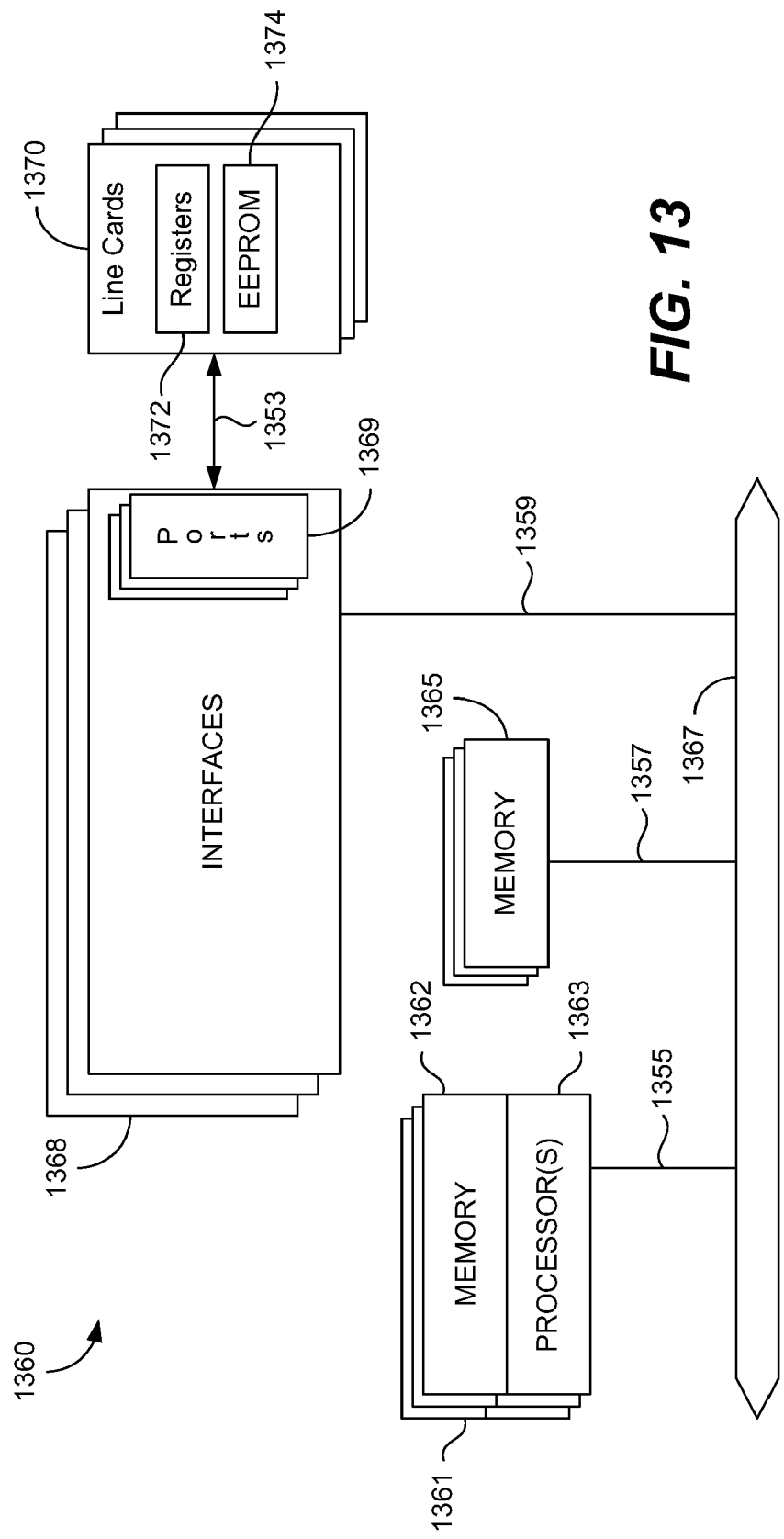
FIG. 13 illustrates an example of a network device that may be configured to implement some methods of the present invention.

FIG. 13 illustrates an example of a network device that may be configured to implement some methods of the present invention. Network device 1360 includes a master central processing unit (CPU) 1362, interfaces 1368, and a bus 1367 (e.g., a PCI bus). Generally, interfaces 1368 include ports 1369 appropriate for communication with the appropriate media. In some embodiments, one or more of interfaces 1368 includes at least one independent processor 1374 and, in some instances, volatile RAM. Independent processors 1374 may be, for example ASICs or any other appropriate processors. According to some such embodiments, these independent processors 1374 perform at least some of the functions of the logic described herein. In some embodiments, one or more of interfaces 1368 control such communications-intensive tasks as media control and management. By providing separate processors for the communications-intensive tasks, interfaces 1368 allow the master microprocessor 1362 efficiently to perform other functions such as routing computations, network diagnostics, security functions, etc.

The interfaces 1368 are typically provided as interface cards (sometimes referred to as "line cards"). Generally, interfaces 1368 control the sending and receiving of data packets over the network and sometimes support other peripherals used with the network device 1360. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1362 may be responsible for implementing specific functions associated with the functions of a desired network device. According to some embodiments, CPU 1362 accomplishes all these functions under the control of software including an operating system (e.g. Linux, VxWorks, etc.), and any appropriate applications software.

CPU 1362 may include one or more processors 1363 such as a processor from the Motorola family of microprocessors or the MIPS family of microprocessors. In an alternative embodiment, processor 1363 is specially designed hardware for controlling the operations of network device 1360. In a specific embodiment, a memory 1361 (such as non-volatile RAM and/or ROM) also forms part of CPU 1362. However, there are many different ways in which memory could be coupled to the system. Memory block 1361 may be used for a variety of purposes such as, for example, caching and/or storing data, programming instructions, etc.

Regardless of network device's configuration, it may employ one or more memories or memory modules (such as, for example, memory block 1365) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 13 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 13) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method of provisioning a device, the method comprising:
   initializing a radio frequency identification ("RFID") device;
   reading RFID tag data from an RFID tag;
   inserting the RFID tag data in an option field of a DHCPDISCOVER request; and
   sending the DHCPDISCOVER request to a Dynamic Host Configuration Protocol ("DHCP") server.

2. The method of claim 1, further comprising a step of determining, based in part on the RFID tag data, an appropriate configuration for the RFID device.

3. The method of claim 2, further comprising the step of provisioning the RFID device according to the appropriate configuration.

4. The method of claim 2, wherein the determining step comprises accessing a data structure that includes locations and corresponding RFID device configurations.

5. The method of claim 2, wherein the determining step is performed by the DHCP server.

6. The method of claim 5, wherein the device is a lightweight directory access protocol ("LDAP") server.

7. The method of claim 2, further comprising the step of sending the RFID tag data from the DHCP server to a device, wherein the determining step is performed by the device.

8. The method of claim 1, wherein the RFID tag data comprise location data.

9. The method of claim 1, further comprising a location determining step of determining, based at least in part on the RFID tag data, a location of the RFID device.

10. The method of claim 9, wherein the location determining step comprises accessing a data structure that includes RFID tag data and corresponding location data.

11. The method of claim 10, wherein the location determining step is performed by the DHCP server.

12. The method of claim 1, wherein the RFID device is a wireless RFID device.

13. A method of determining a device configuration, the method comprising:
   receiving a Dynamic Host Configuration Protocol ("DHCP") request;
   determining a location of a device according to information in the DHCP request; and
   determining, based at least in part on the location, an appropriate configuration for the device, wherein the configuration comprises at least one of a device function or a device setting to perform a device function.

14. The method of claim 13, further comprising configuring the device according to the appropriate configuration.

15. The method of claim 13, wherein the location determining step comprises determining a location encoded in the DHCP request.

16. The method of claim 13, wherein the location determining step comprises:
   accessing a data structure; and
   mapping the information in the DHCP request to corresponding location data.

17. A method for deploying a uniquely-provisioned radio frequency identification ("RFID") device in a network, the method comprising:
   reading location information from a first RFID tag;
   forming a DHCPDISCOVER request that includes an electronic product code ("EPC") of an RFID reader and the location information;
   sending the DHCPDISCOVER request to a Dynamic Host Configuration Protocol ("DHCP") server;
   receiving provisioning information from the DHCP server that enables a desired functionality according to an identity and a location of the RFID reader; and
   provisioning the RFID reader according to the provisioning information, thereby enabling the RFID reader to read nearby RFID tags and to transmit RFID tag information to an RFID network.

18. The method of claim 17, wherein the location information indicates that the RFID reader is positioned near an exit door of a retail store and wherein the RFID tag information comprises information regarding products.

19. The method of claim 18, further comprising the step of using the RFID tag information to automatically update a database maintained by the retail store.

20. The method of claim 18, further comprising the step of using the RFID tag information to cause a financial account to be debited for a cost of the products.

21. The method of claim 18, further comprising the step of using the RFID tag information to automatically update a database maintained by a manufacturer of at least one of the products.

22. The method of claim 18, further comprising the step of using the RFID tag information to automatically update a database maintained by a distributor of at least one of the products.

23. The method of claim 18, further comprising the step of using the RFID tag information to update a business plan.

24. The method of claim 23, wherein the business plan comprises at least one of a marketing plan, a manufacturing plan, a distribution plan and a sales plan.

25. The method of claim 18, wherein the RFID tag information comprises shopper information.

26. The method of claim 17, wherein the location information indicates that the RFID reader is positioned near a door of a warehouse and wherein the RFID tag information comprises information regarding products.

27. The method of claim 26, further comprising the step of using the RFID tag information to automatically update a database maintained by a manufacturer of at least one of the products.

28. The method of claim 26, further comprising the step of using the RFID tag information to automatically update a database maintained by a distributor of at least one of the products.

29. A network, comprising:
   a plurality of radio frequency identification ("RFID") devices;
   a plurality of switches connecting the RFID devices to the network; and
   a Dynamic Host Configuration Protocol ("DHCP") server, wherein at least some of the RFID devices comprise:
      means for reading location information from a first RFID tag;
      means for forming a DHCPDISCOVER request that includes an electronic product code ("EPC") of an RFID reader and the location information;
      means for sending the DHCPDISCOVER request to a Dynamic Host Configuration Protocol ("DHCP") server;
      means for receiving provisioning information from the DHCP server that enables a desired functionality according to an identity and a location of the RFID reader; and
   means for provisioning the RFID reader according to the provisioning information, thereby enabling the RFID reader to read nearby RFID tags and to transmit RFID tag information to an RFID network; and
   wherein the DHCP server comprises:
      means for receiving the DHCPDISCOVER request; and
      means for automatically identifying an RFID device according to a media access control ("MAC") address and an EPC included in the DHCPDISCOVER request and for locating the RFID device according to the location information included in the DHCPDISCOVER request; and
   means for providing the RFID device with a desired functionality according to a device location and identity.

30. A method of provisioning a device, the method comprising:
   initializing a radio frequency identification ("RFID") device;
   obtaining location data;
   inserting the location data in an option field of a DHCPDISCOVER request; and sending the DHCPDISCOVER request to a Dynamic Host Configuration Protocol ("DHCP") server.

31. The method of claim 30, wherein the device includes global positioning system ("GPS") capability and wherein the location data comprise GPS data.

32. The method of claim 30, further comprising:
determining a desired functionality based at least in part on the location data; and
providing provisioning information to the RFID device according to the desired functionality.

33. The method of claim 30, further comprising:
receiving provisioning information from the DHCP server; and
provisioning the device according to the provisioning information.

34. An RFID reader, comprising:
means for initializing a radio frequency identification ("RFID") device;
means for reading RFID tag data from an RFID tag;
means for inserting the RFID tag data in an option field of a DHCPDISCOVER request; and
means for sending the DHCPDISCOVER request to a Dynamic Host Configuration Protocol ("DHCP") server.

35. An apparatus for determining a device configuration, comprising:
means for receiving a Dynamic Host Configuration Protocol ("DHCP") request;
location determining means for determining a location of a device according to information in the DHCP request; and
means for determining, based at least in part on the location, an appropriate configuration for the device, wherein the configuration comprises at least one of a device function or a device setting to perform a device function.

36. The apparatus of claim 35, wherein the location determining means comprises means for querying one of a management server and a Lightweight Directory Access Protocol server.

37. An RFID reader, comprising:
means for reading location information from a first RFID tag;
means for forming a DHCPDISCOVER request that includes an electronic product code ("EPC") of an RFID reader and the location information;
means for sending the DHCPDISCOVER request to a Dynamic Host Configuration Protocol ("DHCP") server;
means for receiving provisioning information from the DHCP server that enables a desired functionality according to an identity and a location of the RFID reader; and
means for provisioning the RFID reader according to the provisioning information, thereby enabling the RFID reader to read nearby RFID tags and to transmit RFID tag information to an RFID network.

* * * * *